US006573313B2

(12) United States Patent
Li et al.

(10) Patent No.: US 6,573,313 B2
(45) Date of Patent: Jun. 3, 2003

(54) AMPHIPHILIC CORE-SHELL LATEXES

(75) Inventors: Pei Li, Kowloon (HK); Jun Min Zhu, Kowloon (HK); Frank W Harris, Akron, OH (US)

(73) Assignee: The Hong Kong Polytechnic University, Kowloon (HK)

( * ) Notice: Subject to any disclaimer, the term of this patent is extended or adjusted under 35 U.S.C. 154(b) by 29 days.

(21) Appl. No.: 09/759,242

(22) Filed: Jan. 16, 2001

(65) Prior Publication Data

US 2002/0143081 A1 Oct. 3, 2002

(51) Int. Cl.[7] .............................................. C08L 83/00
(52) U.S. Cl. ....................................................... 523/201
(58) Field of Search ......................................... 523/201

(56) References Cited

U.S. PATENT DOCUMENTS

| | | | | | |
|---|---|---|---|---|---|
| 4,894,397 A | * | 1/1990 | Morgan | ...................... | 523/201 |
| 5,081,166 A | * | 1/1992 | Kiehlbauch | .................. | 523/201 |
| 5,216,044 A | * | 6/1993 | Hoshino | ...................... | 523/201 |
| 5,747,558 A | * | 5/1998 | Nishi | .......................... | 523/201 |
| 5,786,420 A | * | 7/1998 | Grandhee | ...................... | 525/7 |
| 6,203,973 B1 | * | 3/2001 | Chen | ........................... | 430/627 |

* cited by examiner

Primary Examiner—Edward J. Cain
(74) Attorney, Agent, or Firm—Leydig, Voit & Mayer, Ltd.

(57) ABSTRACT

Amphiphilic latex nanoparticles comprise a core and shell, The core contains hydrophobic vinylic grafted copolymer and hydrophobic vinylic homopolymer, and the shell to which the hydrophobic vinylic polymer is grafted is a hydrophilic, nitrogen-containing polymer. Typically the particles are made by a process which involves generating radicals on the nitrogen atoms of said hydrophilic polymer, and then initiating free-radical polymerisation of said vinylic monomer, hydrophobic vinylic polymer separating to form latexes of highly monodispersed core-shell particles with the hydrophobic polymer as the core and said hydrophilic polymer as the shell.

20 Claims, 15 Drawing Sheets

AMPHIPHILIC CORE-SHELL LATEXES

The present invention relates to amphiphilic core-shell latexes.

BACKGROUND OF INVENTION

There is an increasing demand for colloidal nanoparticles having an amphiphilic core-shell morphology because of their applications in biotechnology, coatings and adhesive, as well as solid supports. Physical adsorption of hydrophilic biopolymer or synthetic polymers is the dominant approach to prepare such microspheres. However, covalent binding techniques appear to be the most suitable with a view to ensuring irreversible fixation and better orientation of the biomolecules. Furthermore, non-specific adsorption problems for the hydrophobic particle surfaces can be avoided.

In particular, there is an increasing interest in the fabrication of composite micro- and nanoparticles that consist of hydrophobic polymer cores coated with shells of different chemical composition, see F Caruso, R A Caruso, H M öhwald, Science, 282, 1111 (1998). In biomedical areas, there is particular interest in polymeric nanoparticles having a hydrophilic biopolymer shell, see F Caruso and H M öhwald, J Am Chem Soc, 121, 6039–6046 (1999). Amphiphilic core-shell particles often exhibit substantially different properties than those of the templated core. For instance, they have very different surface chemical composition and hydrophilicity, and can readily be dispersed in water. Applications of such particles are very diverse. They can be used in diagnostic testing, in bioseparations of target proteins via bonding to the particle surface, and as drug reservoirs in controlled release formulations. They can also serve as a support for gene delivery and cell-growth or for a catalyst, and they can be used in coatings and composite materials. Thus, the preparation of nanoparticles having a well-defined amphiphilic core-shell morphology is extremely significant from both a scientific and a technological point of view.

The following five approaches have been used in the preparation of amphiphilic core-shell nanoparticles:

1) Step-wise deposition of polyelectrolytes from dilute solutions onto charged colloidal polystyrene latex particles. For example, multilayer shells have been formed by the alternate adsorption of oppositely charged polyelecrolytes onto positively charged particles, see G B Sukhorukov, E Donath, H Lichtenfeld, E Knippel, M Knippel, H Möhwald, Colloids Surfaces A: Physicochem. Eng. Aspects, 137, 253 (1998) and G B Sukhorukov, E Donath, S Davis, H Lichtenfeld, F Caruso, V I Popov, H Möhwald Polym. Adv. Tech. 9, 759 (1998)

2) Shell-crosslinked "knedel" (SCK) micelles with a core-shell nanostructure have been formed through self-assembly processes of amphiphilic block copolymers, followed by covalent crosslinking of the shells, see K L Wooley, J. Polym. Sci. Part A: Polym. Chern, 38, 1397 (2000). The amphiphilic diblock and triblock copolymers are prepared by either living anionic or living free radical polymerisation methods, see K L Wooley, J Polym. Sci. Part A: Polym. Chem., 38, 1397 (2000) and V Bütün, X S Wang, M V de Paz Báñez, K L Robinson, N C Billingham, S P Armes and Z Tuzar, Macromolecules, 33, 1 (2000).

3) Two-stage seeded emulsion copolymerisations. A seed latex is first prepared by emulsion polymerisation of a hydrophobic monomer, followed by the polymerisation of a water-soluble monomer via a seeded swelling batch or a semibatch process, see W Li, H D H Stöver, Macromolecules, 33, 4354 (2000), or with reactive seed microspheres, see R Saito, X Ni, A Ichimura and K Ishizu, J. Appl. Polym. Sci., 69, 211 (1998).

4) Using reactive surfactants or macromonomer that are able to copolymerize with monomers. The resulting copolymers typically end up with a thin hydrophilic shell on the particle surface, see S Roy, P Favresse, A Laschewsky, J C de la Cal, J M Asua, Macromolecules, 32, 5967 (1999), and O Soula, A Guyot, N Williams, J Grade, T Blease, J. Polym. Sci. A: Polym. Chem. 37, 4205 (1999], and A Búcsi, J Forcada, S Gibanel, V Héroguez, M Fontanille, Y Gnanou, Macromolecules, 31, 2087 (1998).

5) Graft copolymerisations of water-soluble monomers onto a functionalised core particle surface. For example, Ce(IV)-initiated grafting of N-(2-methoxyethyl acrylamide) onto poly(styrene-co-2-hydroxyethyl acrylate) particles has been reported, see D Hritcu, W Muller and D E Brooks, Macromolecules, 32, 565 (1999).

In spite of the success of these approaches in the preparation of amphiphilic core-shell nanoparticles, there are still some major drawbacks to these systems. For example:

In the first approach, the deposition procedure is very complicated and time-consuming. After each adsorption step, the free polyelectrolytes need to be removed by repeated centrifugation and washing cycles. In addition, the polyelectrolyes are physically adsorbed on the particle surface via charge interactions. Thus, the shell layer is very sensitive to pH changes.

Tedious multiple step syntheses are required for the preparation of amphiphilic block copolymers, reactive surfactants, macromonomers and the functionalised latex particles used in the second to fourth approaches.

In the third and fifth approaches, the hydrophilic monomers usually have higher reactivity than the matrix monomers, thus resulting in low surface incorporation and formation of a large amount of water-soluble polymers. Furthermore, highly oxidative conditions are required for the grafting processes that prevent the use of biological molecules.

OBJECT OF THE INVENTION

Thus a new technique for making amphiphilic core-shell nanoparticles is extremely desirable from both a scientific and a technological point of view.

SUMMARY OF INVENTION

The present invention provides amphiphilic core-shell latex nanoparticles. The core is composed of homopolymer of a hydrophobic vinylic monomer, and grafted copolymer of the hydrophobic vinylic monomer. The shell to which the polymer is grafted is hydrophilic, nitrogen-containing polymer.

Thus, we have developed a facile route to prepare a variety of well-defined amphiphilic core-shell latex nanoparticles with covalent linkages. In our approach, a graft copolymerisation of a vinylic monomer onto an nitrogen-containing, water-soluble polymer is conducted in water or other aqueous systems.

PREFERRED EMBODIMENTS

In a preferred process, radicals are first generated on the nitrogen atoms of the hydrophilic polymer through interaction with alkyl hydroperoxide or by other means, and then initiate the free-radical polymerisation of vinylic monomer. The hydrophobic side chains of vinylic polymer generated during the reaction phase separate to form latexes of monodisperse core-shell particles with the hydrophobic polymer as the core and the hydrophilic polymer as the shell.

For example, poly(ethyleneimine) (PEI) is a commercially available water-soluble polymer. It contains 25% primary, 50% secondary and 25% tertiary amino groups. It was discovered that the graft copolymerisation of methyl methacrylate (MMA) onto PEI could be readily achieved in water in the presence of a trace amount of an alkyl hydroperoxide (ROOH) at 80° C. A nearly quantitative conversion of MMA is obtained in 2 h, giving a stable white emulsion with mean particle sizes ranging from 120 to 135 nm (diameter) and a very narrow size distribution (~1.1). TEM micrographs clearly reveal that the nanoparticles have core-shell morphology with the PMMA as the core and PEI as the shell. The presence of PEI in the shell layer has been further confirmed with Zeta potential measurements.

DETAILED DESCRIPTION

The nitrogen-containing hydrophilic polymer can be natural or synthetic. The nitrogen is preferably present as an amine group. Primary amine ($-NH_2$), secondary amine ($-NRH$), and tertiary amine ($-NR_2$) are the preferred functional groups for this reaction. Structurally, the amino containing polymers may be in the form of linear or cyclic aliphatic or aromatic amine. The amino function may be located in the polymer main chain or in the side chains. Less preferred functional groups are amides including unsubstituted amide ($-CONH_2$), mono-substituted amide ($-CONH-R$) and disubstituted amide ($-CONRR'$), which tend to give lower conversion.

In general, biopolymers containing both amino and amide groups and synthetic polymer containing amine groups give high conversion of the monomer and form very stable core-shell nanoparticles with narrow size distribution.

Examples of the nitrogen-containing polymer include synthetic amino polymers such as polyethyleneimine, N-acetyl sugars such as chitosan, or proteins such as casein, gelatin or bovine serum albumin.

The vinylic polymer is prepared using a vinylic monomer. The nature of the monomer is not critical, and for instance it is possible to employ a vinyl monomer, a diene, an acrylate monomer or an acrylamide monomer.

Examples of vinylic monomers include those of formula $R^1R^2C=CH$, where $R^1$ is hydrogen or alky, and where $R^2$ is alkyl, aryl, heteroaryl, halo, cyano, or other suitable hydrophobic group. Preferred groups for $R^1$ include hydrogen and methyl. Preferred groups for $R^2$ include $C^1-C_6$ alkyl; phenyl; monocyclic heteroaryl with 4 to 8 ring atoms, more preferably 5 or 6 ring atoms, and with 1, 2 or 3 ring heteratoms, preferably 1 or 2, more preferably 1 ring atom, selected from nitrogen, oxygen or sulfur; chloro; and cyano.

Examples of dienes include those of formula $CH_2=C(R^1)-C(R^2)=CH_2$ where $R^1$ is hydrogen or halogen or alkyl, and where $R^2$ is hydrogen or alkyl, especially $C_1-C_6$ alkyl. Preferred groups for $R^1$ include hydrogen, chloride and methyl. Preferred groups for $R^2$ include hydrogen and methyl.

Examples of acrylate monomers include those of formula $CH_2=CR^3COOR^4$, where $R^3$ is hydrogen or alky, and where $R^4$ is alkyl or substituted allyl, or other suitable hydrophobic group. Preferred groups for $R^3$ include hydrogen and methyl. Preferred groups for $R^4$ include $C_1-C_{16}$, more preferably $C_1-C_{12}$, alkyl which may be straight-chain or branched, and such groups substituted with one or more substituents chosen from unsubstituted amino, monosubstituted amino or disubstituted amino, hydroxy, carboxy, or other usual acrylate substituent. Particular acrylate monomers comprise ethyl (meth)acrylate, isopropyl (meth) acrylate, n-butyl (meth)acrylate, and the like.

Examples of acrylamide monomers include those of formula $CH_2=CR^3COONHR^4$, where $R^3$ and $R^4$ are as defined.

For forming the core-shell nanoparticles using the vinylic monomer, the nitrogen-containing polymer is preferably dissolved in an aqueous system, either water, acid or alkali or other appropriate system chosen to suit the polymer. The weight ratio of monomer to nitrogen-containing polymer is usually in the range of 1:1 to 10:1, preferably 2:1 to 6:1. In a typical experiment, there is 0.5 to 2 wt/wt % nitrogen-containing polymer, and 2 to 8 or 10 wt/wt % vinylic monomer. A radical initiating catalyst is preferred, notably a hydroperoxide. Hydroperoxide may be used in combination with a metal ion such as ferric ion or with a low molecular weight polyamine. The mole ratio of vinylic monomer to catalyst is preferably more than 1000:1 and suitably around 5000:1. Other catalysts include potassium persulfate and 2,2'-azobis(2-amidinopropane) hydrochloride, Depending on the nature of the hydrophilic polymer, the reaction might proceed at ambient temperature, but usually an elevated temperature is more effective, typically 40 to 95° C., preferably 60 to 85° C. for a period of say 1 to 4 hours under an appropriate atmosphere such as nitrogen.

Preferred products have a particle size of less than 200 nm, measured as $D_n$, the number average diameter. Typically the size distribution is narrow, as shown in the accompanying figures. Dn/Dv values as a measure of size distribution are preferably in the range of about 1.1 or 1.2. The polydispersity, $M_w/M_n$, of the polymerized vinylic monomer is preferably in the range 1.5 to 3, usually around 2.

Thus, in a typical preferred embodiment, the present invention involves a new method to prepare well-defined amphiphilic core-shell nanoparticles via an aqueous graft copolymerization of vinylic monomer onto amine-containing water-soluble polymers including biopolymers and synthetic polymers. In this process, radicals are first generated either through the interaction between nitrogen atom with alkyl hydroperoxide (ROOH) or other catalyst, then initiate the free-radical polymerization of the vinylic monomer. The hydrophobic side chains of vinylic polymer or its homopolymer generated during the reaction phase separate to form latexes of core-shell nanostructure with the hydrophobic component as the core and the hydrophilic polymer as the shell.

This method has several distinct advantages:

1) Simple and convenient method. One step synthesis via alkyl hydroperoxide-induced graft copolymerisation and homopolymerisation of vinylic monomer in water-soluble polymer.

2) High efficiency, only trace amount of alkyl hydroperoxide is required to induce the graft copolymerization. Thus the covalent bonding of the grafted copolymer is produced with only one to three grafting points. This is particularly important for the biomolecule because in this way, most of active sites remain free and unchanged. Furthermore, this approach overcomes the oxidative degradation and high toxicity problems present in the current grafting methods.

3) Covalent linkage of hydrophilic polymer on the particle surface

4) Very versatile, a much wider range of novel biomaterials and synthetic polymers of core-shell particles can be easily prepared.

5) Discrete core-shell nanoparticles with various biopolymer or hydrophilic polymer on the surface can be readily produced with different sizes, compositions, structures, and functions.

6) A core-shell morphology is obtained where the core diameter and shell thickness can be easily altered.

7) No surfactants are required.

8) The use of aqueous-based chemistry.

LIST OF ABBREVIATIONS:

| Abbreviation | Full Name |
| --- | --- |
| AFM | Atomic force microscopic |
| BSA | Bovine serum albumin |
| BPO | Benzoyl peroxide |
| CHP | Cumene hydroperoxide |
| KPS | Potassium persulfate |
| LCST | Lower critical solution temperature |
| NIPAM | N-isopropylacylamide |
| PAA | Poly(acrylic acid) |
| PAM | Polyacrylamide |
| P(Am-co-AA) | Poly(acrylamide-co-acrylic acid) |
| PEG | Poly(ethylene glycol) |
| PEI | Polyethyleneimine |
| PNIPAM | Poly(N-isopropylacrylamide) |
| PVA | Poly(vinyl alcohol) |
| PVP | Polyvinylpyrrolidone |
| ROOH | Alkyl hydroperoxide |
| SEM | Scanning electron microscopy |
| TBHP (t-BuOOH) | Tert-butyl hydroperoxide |
| TBP | Di-tert-butyl peroxide |
| TEM | Transmittance electron microscopy |
| V-50 | 2,2'-azobis(2-amidinopropane) dihydrochloride |

EXAMPLES OF THE INVENTION

Figure 1:
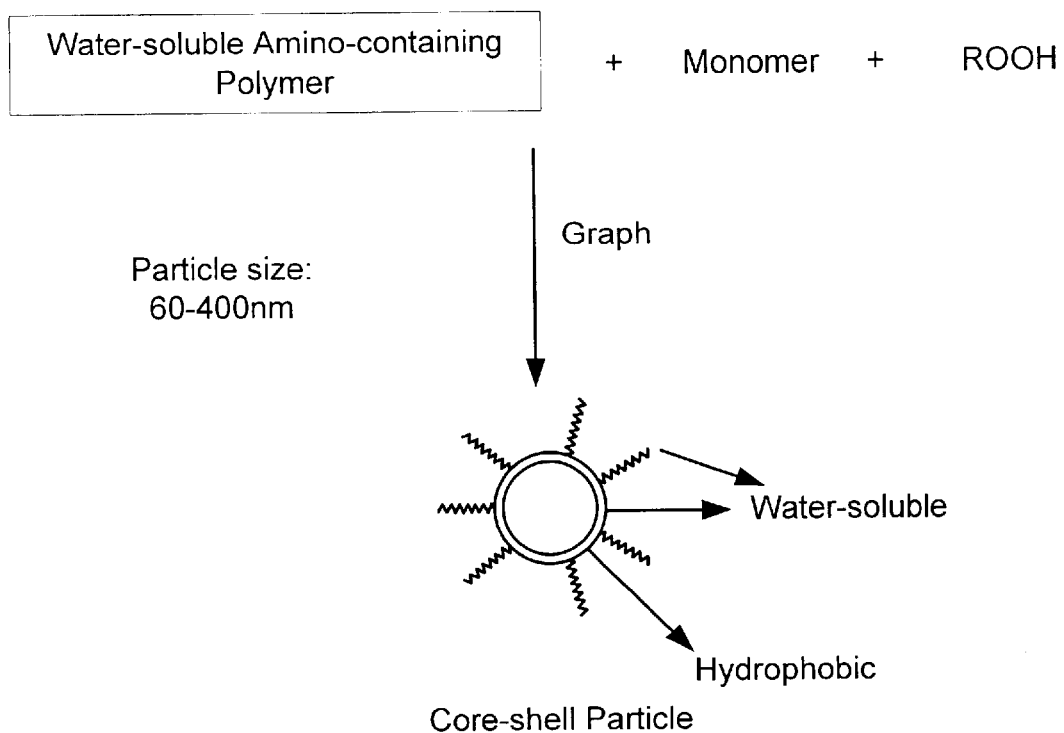
FIG. 1. A reaction scheme for a preferred embodiment of this invention.

Water-soluble polymers having amino functional groups Examples of polymerization of methyl methacrylate under varying conditions with different nitrogen-containing polymers are given in table 1.

TABLE 1

Graft copolymerization of MMA onto polymers using alkyl hydroperoxides[a]

| Polymer | TBHP (mM) | CHP (mM) | Conv. (%) | Grafting[b] (%) | Efficiency[c] (%) | $D_n$ (nm) | $D_v/D_n$[d] |
| --- | --- | --- | --- | --- | --- | --- | --- |
| Casein[e] | 0 | | 5.6 | — | — | — | — |
| | 0.02 | | 17.4 | 27.8 | 39.8 | 71 | 1.34 |
| | 0.04 | | 62.0 | 99.8 | 40.2 | 78 | 1.21 |
| | 0.08 | | 82.3 | 131.1 | 39.9 | 82 | 1.17 |
| | 0.12 | | 85.9 | 134.0 | 39.0 | 80 | 1.19 |

TABLE 1-continued

Graft copolymerization of MMA onto polymers using alkyl hydroperoxides[a]

| Polymer | TBHP (mM) | CHP (mM) | Conv. (%) | Grafting[b] (%) | Efficiency[c] (%) | $D_n$ (nm) | $D_v/D_n$[d] |
|---|---|---|---|---|---|---|---|
|  |  | 0.08 | 80.7 | 117.5 | 36.4 | 71 | 1.24 |
| Gelatin | 0.08 |  | 80.1 | 144.4 | 45.1 | 160 | 1.16 |
| BSA | 0.04 |  | 67.0 | 105.6 | 39.5 | 66 | 1.20 |
|  | 0.08 |  | 81.6 | 205.5 | 63.0 | 63 | 1.18 |
|  | 0.12 |  | 95.1 | 198.9 | 52.3 | 62 | 1.17 |
|  | 0.16 |  | 93.4 | 206.0 | 55.2 | 63 | 1.17 |
| Chitosan[f] | 0.08 |  | 97.5 | 55.5 | 15.3 | 144 | 1.21 |
| PEI | 0.08 |  | 90.5 | 187.2 | 51.7 | 132 | 1.12 |
| PAM | 0.08 |  | 8.0 | — | — | — | — |
| PVP | 0.08 |  | 7.6 |  |  |  |  |

[a]Reaction conditions: 100 g of reaction mixture contains 95 g distilled water, 1 g water-soluble polymer, 4 g of purified MMA monomer and an appropriate concentration of ROOH. Reaction took place at 80° C. for 2 h under $N_2$.
[b]Grafting percentage = weight of PMMA grafted/weight of hydrophilic polymer charged × 100
[c]Grafting efficiency = weight of PMMA grafted/weight of MMA polymerized × 100
[d]$D_n$ and $D_v$ are number-average and volume-average diameter, respectively. $D_v/D_n$ is defined as the polydispersity index of particle size distribution.
[e]Casein was dissolved in 0.4 wt % sodium carbonate aqueous solution.
[f]Chitosan was dissolved in 1.8 wt % acetic acid solution.

Water-soluble synthetic polymers containing other functional groups such as poly(vinyl alcohol) (PVA), poly (acrylic acid)) (PAA), and polyethylene glycol (PEG-1000) have been tested, and less than 10% conversions were obtained.

Vinylic Monomer

Possible types of vinyl monomers for the graft copolymerizations are shown in Table 2.

TABLE 2

Structures of Various Vinyl Monomers

| Type of Vinyl Monomer | R | R' |
|---|---|---|
| Vinyls<br>$CH_2=CR(R')$ | —H<br>—CH₃ | Alkyl<br>Phenyl<br>Pyridine<br>—Cl<br>—CN<br>—OAc |
|  | —Cl |  |
| Diene<br>$CH_2=CR-CR'=CH_2$ | —H<br>—Cl<br>—CH₃ | H<br>CH₃ |
| Acrylates<br>$CH_2=CR-C(=O)-OR'$ | —H<br>—CH₃ | Linear or branched alkyl groups<br>Alkyl groups containing functional groups such as amine, hydroxyl, carboxylic acid etc. |
| Acrylamides<br>$CH_2=CR-C(=O)-NH-R'$ | —H<br>—CH₃ | Linear or branched alkyl groups<br>Alkyl groups containing functional groups such as amine, hydroxyl, carboxylic acid etc. |

Radical Initiator

Alkyl hydroperoxides (ROOH) such as t-butyl hydroperoxide (TBHP, t-BuOOH) and cumene hydroperoxide (CHP) are seldom used alone to initiate a polymerization reaction due to high decomposition temperature (half life time=0.44 h at 150° C., and 12 h at 120° C). In addition, hydrogen of ROOH is susceptible to be abstracted by HO. or RO. radical to form peroxy radical, which is not sufficiently reactive to initiate the polymerisation of monomer. Thus, alkyl hydroperoxides are poor initiators and need to be activated by other reagents. For example, cumene hydroperoxide has been extensively used with $Fe^{2+}$ in low temperature polymerisation. Besides metal ion, low molecular weights of polyamines have also found to form redox pairs with alkyl hydroperoxides and activate their decomposition. For instance, TBHP/tetraethylene pentamine (TEPA) has been employed to prepare natural rubber/PMMA composite latexes. Although there are a few reports on amine-activated hydroperoxide initiation of vinyl monomer polymerisation, no one has used a ROOH to induce the graft copolymerization of vinyl monomers directly onto a water-soluble, amine-containing polymer.

Alkyl hydroperoxides such as t-butyl hydroperoxide, cumene hydroperoxide, p-isopropyl cumene hydroperoxide, p-menthane hydroperoxide and pinane hydroperoxide are suitable initiating agents to induce the graft copolymerization of vinyl monomer onto the water-soluble polymers. Grafting percentage can be as high as 200% of the hydrophilic polymer backbone. To compare the grafting efficiency using TBHP/TEPA system, which has been reported to initiate the polymerization of vinyl monomer, MMA was allowed to polymerise in this initiator system in the presence of BSA or gelatin at 40° C. High conversion of MMA (>90%) was achieved after 2 hours, but only homopolymer of PMMA was obtained. No grafting products were isolated.

Since our study of reaction temperature indicates that ROOH-induced graft copolymerization of MMA onto BSA or gelatin only occurs above 70° C., the PMMA homopolymer obtained must have initiated with ROOH/TEPA redox system. Interestingly, when the polymerization was raised to 80° C., similar result was obtained. These results suggest that the ROOH/TEPA initiating system is so reactive that the ROOH has no chance to interact with the amine groups of the protein, and generates grafting sites on the biopolymer backbone. Thus only homopolymer of PMMA was obtained.

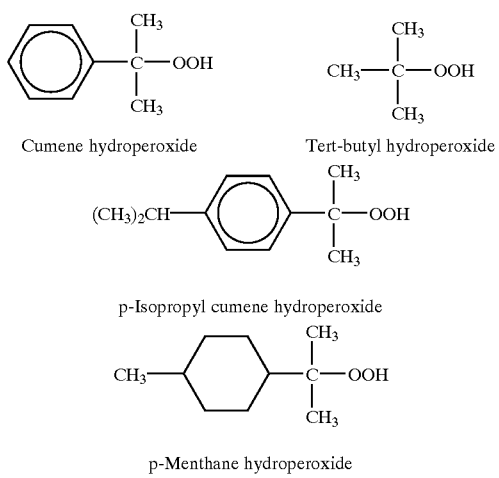

Cumene hydroperoxide

Tert-butyl hydroperoxide p-Isopropyl cumene hydroperoxide p-Menthane hydroperoxide Other radical initiators have also been carefully investigated for the graft copolymerization of MMA onto hydrophobic polymer. Results are listed in Table 3.

TABLE 3

Other Radical Initiators for the Graft Copolymerization of MMA onto hydrophobic polymers[a]

| Hydrophilic polymer | Initiator | Conc. [mM] | Conv. (%) | Grafting (%) | Effi. (%) | $D_n$ (nm) | $D_v/D_n$ |
|---|---|---|---|---|---|---|---|
| Casein | TBHP | 0.08 | 82 | 131 | 40 | 83 | 1.17 |
|  | CHP | 0.08 | 81 | 113 | 35 | 71 | 1.24 |
|  | KPS | 0.08 | 67 | 132 | 50 | 70 | 1.24 |
|  | V-50 | 0.08 | 77 | 131 | 43 | 70 | 1.25 |
|  | AIBN | 0.25 | 56 |  |  |  |  |
|  | BPO | 0.25 | 7 |  |  |  |  |
|  | TBP | 0.25 | 3 |  |  |  |  |
| PEI | TBHP | 0.08 | 96 | 187 | 47 | 132 | 1.12 |
|  | KPS | 0.25 | 24 | — | — | — |  |
|  | V-50 | 0.25 | 91 | 59 | 16 |  |  |
|  | TBHP/TEPA | 10/1 0.2/0.2 | 99 77 | 0 4 | 0 1 | 89 121 | 1.17 1.09 |
| PVA | TBHP | 0.12 | 0 |  |  |  |  |

[a]Reaction conditions: 100 g of reaction mixture contains 95 g distilled water, 1 g water-soluble polymer, 4 g of purified MMA monomer and an appropriate concentration of initiator. Reaction took place at 80° for 2 h under $N_2$.

TABLE 3-continued

Other Radical Initiators for the Graft Copolymerization of MMA onto hydrophobic polymers[a]

| Hydrophilic polymer | Initiator | Conc. [mM] | Conv. (%) | Grafting (%) | Effi. (%) | $D_n$ (nm) | $D_v/D_n$ |
|---|---|---|---|---|---|---|---|

[b]$D_n$ and $D_v$ are number-average and volume-average diameter, respectively. $D_v/D_n$ is defined as the polydispersity index of particle size distribution.
[c]Casein was dissolved in 0.4 wt % sodium carbonate aqueous solution.

Studies of various initiators for the graft copolymerisation of casein demonstrate that besides the ROOH, some other radical initiators such as KPS and V-50 are also able to perform the similar reactions, and give comparable results. But oil soluble initiators such as AIBN, BPO, and TBP give low conversions of MMA. Although KPS and V-50 have been used in the graft copolymerization of various biopolymers onto vinyl monomers, the mole ratios of monomer to these initiators are usually between 100 to 300:1, while the mole ratios of MMA to KPS and V-50 required in our system are much less (5000:1). Furthermore, formation of nanoparticles with core-shell structure has never been addressed in the literature.

Although use of KPS gives comparable results to the use of TBHP for the graft copolymerization of MMA onto casein, much lower conversion was obtained when it was used in the graft copolymerization of MMA onto PEI. On the other hand, high conversion of MMA could be achieved when using V-50, but grafting efficiency was significantly reduced, indicating that more homopolymer was formed. These results evidently demonstrate that use of TBHP has obviously advantages than other initiators in the presence of PEI.

Interestingly, when TBHP was used alone to initiate the graft copolymerization of MMA onto poly(vinyl alcohol), the polymerization did not occur at all. On the other hand, using TBHP/TEPA gave quantitative conversion, but no grafted copolymer was isolated. These results evidently prove that TBHP indeed interacts with amine groups of the hydrophilic polymer to form redox pair. Thus the high grafting efficiency achieved in PEI/MMA/TBHP system is attributed from the formation of redox pair between amine groups on PEI and TBHP. Two reactive radicals are generated. One is on the PEI backbone, which initiate the graft copolymerization of MMA. Another one is RO radical, which tends to initiate the homopolymerization of vinylic monomer.

Reaction Temperature

Figure 2:
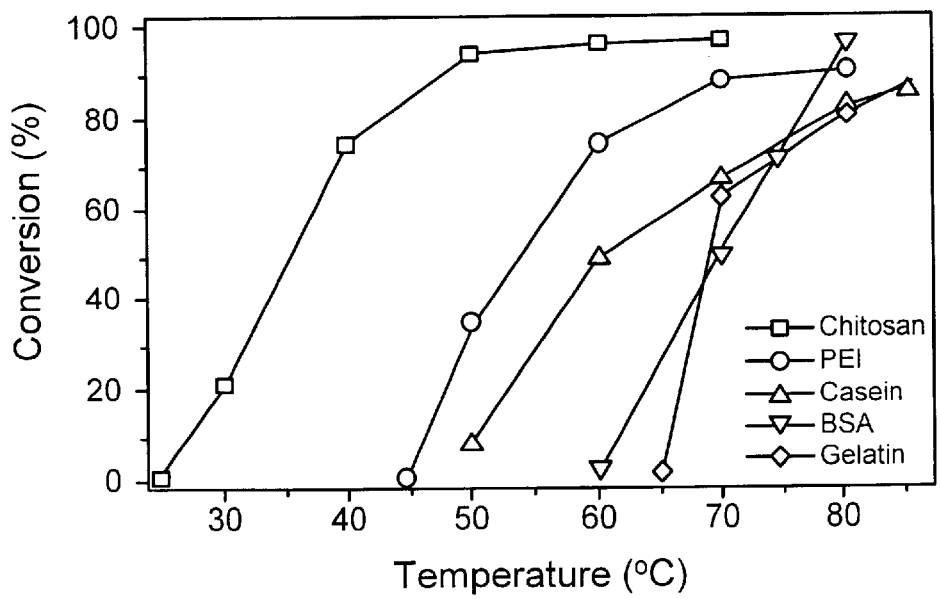
FIG. 2. Dependence of MMA conversion as a function of reaction temperature for various hydrophilic polymers FIG. 3. Graft copolymerization of MMA onto casein at 70° C.

The graft copolymerization temperatures were found to be strongly dependent upon the structures of hydrophilic polymers. FIG. 2 exhibits the dependence of MMA conversion as a function of reaction temperature for various hydrophilic polymers. The effect of reaction temperature may be associated with the quantity of amino groups and their availability in each amphiphilic polymer, see Table 4.

TABLE 4

Comparison of Amino content of various hydrophilic polymers

| Name | Structure | Composition of amino group |
|---|---|---|
| Polyethylene-imine | $-[CH_2-CH_2-NH]_x-[CH_2-CH_2-N]_y-$ with side chain $-CH_2-CH_2-NH_2$ | 25% primary, 50% secondary, 25% tertiary |
| Chitosan | $[$ glucosamine-NHAc $]_m [$ glucosamine-NH$_2$ $]_n$ structures | ~85% based on FTIR and elemental analysis |
| Casein Mw = 33,600–375,000 | Amino —NH$_2$ groups are contributed from Lysine, arginine, histidine and tryptophan | Amino-function: 1.16 mmol/g |
| Gelatin Mw = 1 × 10$^5$ to 5 × 10$^5$ Isoionic pH = 4.8–5.2 | Source of amino groups: Lysine Hydroxylysine Arginine Histidine α-NH$_2$ | Amino-function: 0.94 mmol/g |
| BSA | Similar to above amino groups | |

Biopolymer-Polymer Core-Shell Latexes

The present invention permits the viable construction of functional surface layers with a high density of biomolecules. This is of particular importance where the signal, as a result of biological interaction, needs to be amplified for the successful detection of various species, or where a higher efficiency of product from enzyme-substrate reactions is required. These kinds of biopolymer-polymer core-shell latexes will certainly find extensive applications in immunoassays, affinity separations, catalysts and drug delivery.

Casein/Poly(methyl methacrylate) Core-Shell Nanoparticles

To a total volume of 100 mL, 1.0 g of casein and 0.4 g of $Na_2CO_3$ was first dissolved in distilled water at 50° C. in a water-jacketed flask equipped with a thermometer, a condenser and a nitrogen inlet under magnetic stirring. Nitrogen was bubbled through the solution for 30 minutes to remove the dissolved oxygen. The reaction flask was then heated to the desired reaction temperature (see Table 5) with a circulating water bath, followed by the addition of required amounts of MMA and ROOH. The polymerization was carried out under nitrogen atmosphere for 2 h, and was stopped by cooling the flask in an ice-water bath. The MMA conversion was determined by gravimetric method. The grafting percentage (the weight ratio of grafted MMA and casein added) was determined based on the PMMA homopolymer isolated after Soxhlet extraction of the resultant polymers with chloroform for 48 hours. Particle sizes and their distributions were measured by a Coulter LS230 Particle Size Analyzer, and results are summarized Table 5:

TABLE 5

Graft copolymerization of MMA onto casein

| NO. | Weight ratio MMA:Casein | TBHP (mM) | CHP (mM) | Temp (° C.) | Conv (%) | Grafting (%) | Efficiency (%) | $D_n$ (nm) | $D_n/D_v$ (nm) |
|---|---|---|---|---|---|---|---|---|---|
| 1 | 2:1 | 0.08 | | 80 | 60.6 | 56.4 | 46.3 | 93 | 1.14 |
| 2 | 3:1 | 0.08 | | 80 | 73.9 | 90.2 | 40.6 | 73 | 1.24 |
| 3 | 4:1 | 0.08 | | 80 | 82.3 | 131.1 | 39.9 | 83 | 1.17 |
| 4 | 5:1 | 0.08 | | 80 | 83.1 | 181.9 | 43.8 | 86 | 1.16 |
| 5 | 6:1 | 0.08 | | 80 | 83.8 | 223.0 | 44.4 | 91 | 1.15 |
| 6 | 4:1 | 0.00 | | 80 | 10.9 | — | — | 85 | 3.65 |
| 7 | 4:1 | 0.04 | | 80 | 62.1 | 99.8 | 40.2 | 78 | 1.21 |
| 8 | 4:1 | 0.06 | | 80 | 81.4 | 128.2 | 39.6 | 75 | 1.17 |
| 9 | 4:1 | 0.08 | | 80 | 82.3 | 131.1 | 39.9 | 83 | 1.17 |
| 10 | 4:1 | 0.10 | | 80 | 85.2 | 140.1 | 41.3 | 78 | 1.21 |
| 11 | 4:1 | 0.12 | | 80 | 85.9 | 134.0 | 39.0 | 80 | 1.19 |

TABLE 5-continued

Graft copolymerization of MMA onto casein

| NO. | Weight ratio MMA:Casein | TBHP (mM) | CHP (mM) | Temp (° C.) | Conv (%) | Grafting (%) | Efficiency (%) | $D_n$ (nm) | $D_n/D_v$ (nm) |
|---|---|---|---|---|---|---|---|---|---|
| 12 | 4:1 | 0.08 | | 50 | 6.8 | — | — | 86 | 4.63 |
| 13 | 4:1 | 0.08 | | 60 | 48.8 | 73.6 | 37.7 | 83 | 1.18 |
| 14 | 4:1 | 0.08 | | 70 | 65.0 | 105.7 | 40.7 | 82 | 1.18 |
| 15 | 4.1 | 0.08 | | 80 | 82.3 | 131.1 | 39.9 | 83 | 1.17 |
| 16 | 4:1 | 0.08 | | 85 | 86.8 | 133.1 | 38.3 | 79 | 1.20 |
| 17 | 4:1 | | 0.04 | 80 | 48.2 | 61.0 | 31.6 | 71 | 1.23 |
| 18 | 4:1 | | 0.06 | 80 | 79.6 | 109.1 | 34.3 | 77 | 1.21 |
| 19 | 4:1 | | 0.08 | 80 | 80.7 | 112.5 | 34.8 | 71 | 1.24 |
| 20 | 4:1 | | 0.10 | 80 | 79.9 | 105.1 | 32.9 | 91 | 1.23 |

\* Reactions were all carried out under $N_2$ for two hours.
\* Dn and Dv are the number-average and volume-average diameter, respectively.

Effect of Monomer Concentration

The effect of MMA to casein ratios from 2:1 to 6:1 (items 1–5 in Table 5) on MMA conversion, grafting percentage and grafting efficiency was investigated. It was found that conversion increased with increasing the MMA concentration up to 0.4 M (the ratio of MMA/casein=4:1). Further increase of MMA concentration resulted in little change in conversion, but increasing in the grafting percentages. On the other hand, similar grafting efficiencies were obtained, which suggested that the amounts of graft copolymer and homopolymer formed during the polymerization increased concurrently with increasing monomer concentration. It was also found that increasing MMA to casein ratio resulted in slightly bigger particles.

Effect of Alkyl Hydroperoxide Concentration

The influences of TBHP concentrations from 0.02 mM to 5.0 M were examined. Surprisingly, it was found that only a very small amount of hydroperoxide (<0.1 mM) was needed to induce the graft copolymerization of MMA onto casein. However, little reaction took place in the absence of TBHP (item 6). Results in Table 5 (item 7–11) showed that an increase of TBHP concentration from 0.04 to 0.06 M significantly increases the monomer conversion from 62 to 81% and grafting percentage from 100 to 128%. This effect may be due to the increase of redox pairs formed between TBHP and amine groups onto the casein backbone. Further increase of TBHP concentrations up to 0.12 mM gave similar conversion, grafting percentage, grafting efficiency, an even the particle sizes. Thus TBHP concentration of 0.08 mM was selected for the subsequent studies.

Effect of Reaction Temperature

Effect of reaction temperature of the graft copolymerization of MMA onto the casein was also investigated (Table 5, item 12–16). It was found that reaction temperatures had to be raised up to 80° C. or higher in order to achieve reasonable conversion in 2 hours.

Effect of CHP Initiator

The influence of ROOH structure was examined by using CHP instead of TBHP. CHP was also found to effectively initiate the graft copolymerization of MMA onto casein. The optimum CHP concentration was from 0.06 to 0.08 mM. Further increasing the CHP concentration had little change regarding the conversion, percentage grafting and efficiency. In comparison of CHP with TBHP (item 9 and 19), TBHP seems to be slightly better than CHP, which may be due to the fact that TBHP has better water solubility than CHP.

Reaction Kinetic

Figure 3:
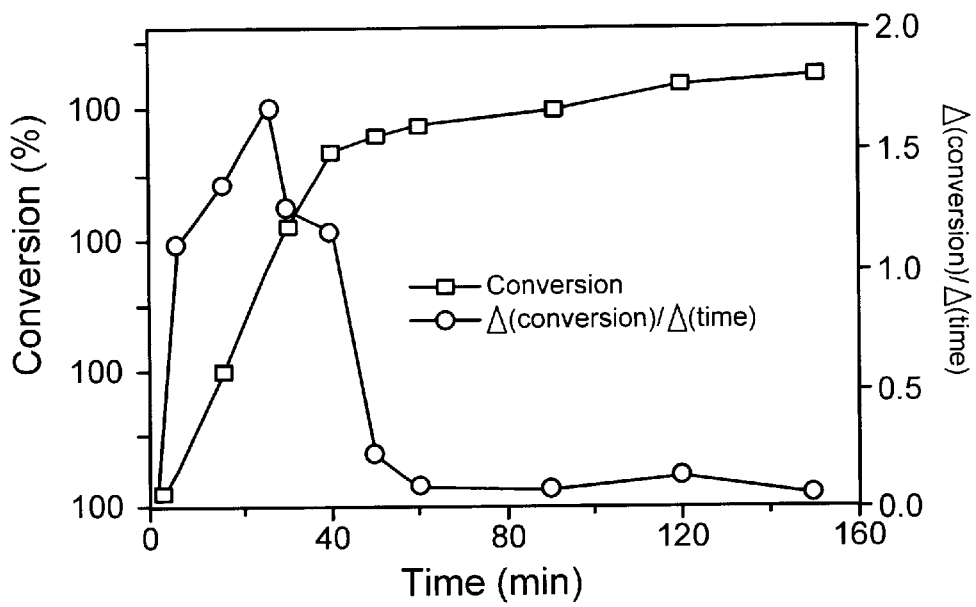

The conversion of MMA monomer and the rate of graft copolymerizaton of MMA onto casein are shown in FIG. 3. The profile of polymerization kinetic measured at 70° C. is very similar to the kinetic of a batch emulsion polymerization reported in the literature. Thus this study strongly suggests that TBHP/casein graft copolymerization proceeds through an emulsion polymerization mechanism. When the reaction was heated up to 80° C., 95% conversion could be achieved in 40 minutes. Thus, two hours reaction time allowed the reaction to a near complete conversion at 80° C.

Figure 4:
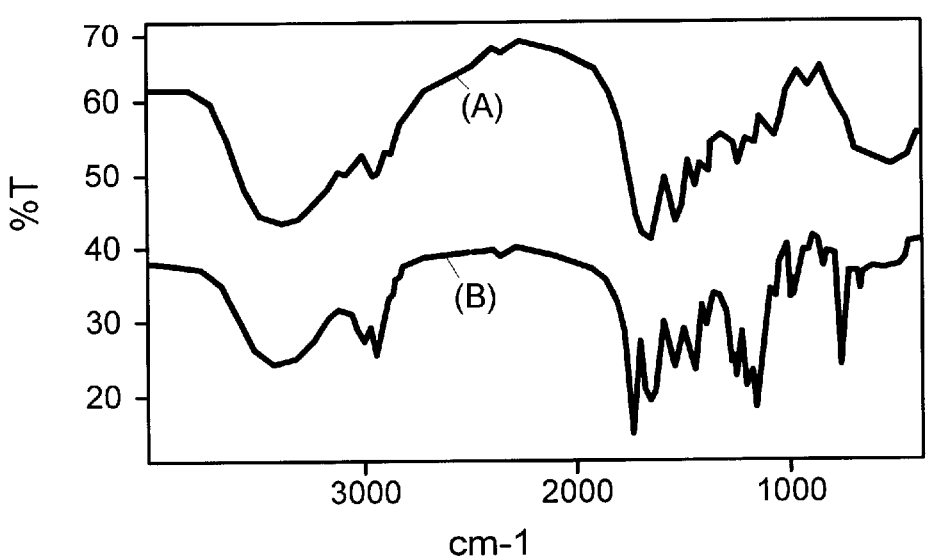
FIG. 4. FT-IR spectra of (A) casein and (B) casein-g-PMMA

A strong carbonyl absorption peak at 1735 $cm^{-1}$ in the FTIR spectrum of the graft copolymer isolated after Soxhlet extraction evidently indicates that PMMA was grafted onto the backbone of casein (FIG. 4).

Besides the formation of graft copolymer, homopolymer of PMMA was also formed. GPC results listed in Table 6 show that high molecular weights of both homo-PMMA and the grafted PMMA with polydispersity ranging from 1.8 to 2.5 were obtained. Moreover, the molecular weight of the grafted PMMA was found to be generally less than that of homopolymerized PMMA.

TABLE 6

Average Molecular Weight of PMMA determined by GPC

| MMA:Casein (M) | TBHP (mM) | Temp. (° C.) | PMMA | Mn | Mw | Mw/Mn |
|---|---|---|---|---|---|---|
| 0.4 | 0.08 | 80 | Grafted | 281,800 | 505,200 | 1.79 |
| | | | Homo | 315,690 | 584,100 | 1.85 |
| 0.4 | 0.04 | 80 | Grafted | 261,700 | 507,700 | 1.94 |
| | | | Homo | 324,100 | 790,800 | 2.44 |
| 0.4 | 0.08 | 70 | Grafted | 280,300 | 684,400 | 2.44 |
| | | | Homo | 431,800 | 941,500 | 2.18 |
| 0.4 | 0.08 | 60 | Grafted | 302,800 | 548,200 | 1.81 |
| | | | Homo | 324,800 | 644,400 | 1.98 |

Figure 5:
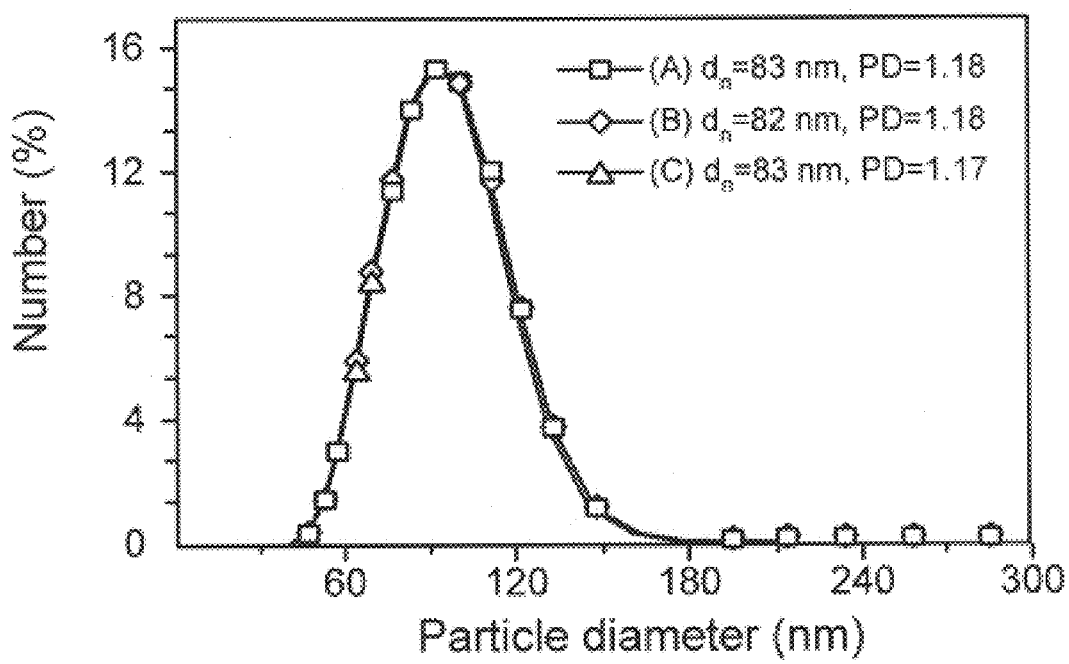
FIG. 5. Particle size and distribution of latex prepared at 60° C. (A), 70° C. (B), 80° C. (C) ([Casein]=1 wt %, [MMA]=0.4 M, [TBHP]=0.08 mM, 2 h).

FIG. 5 demonstrates the particle size and its distribution measured by a Coulter LS230 Particle Size Analyzer. The sizes are usually around 82 nm with very narrow size distribution (PD<1.2). Furthermore, the reaction temperature has little effect on the particle size and its distribution.

Figure 6:
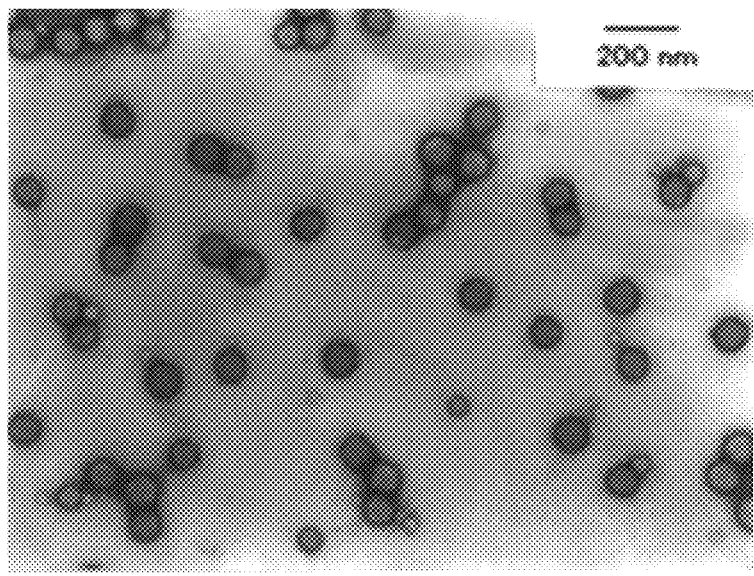
FIG. 6. TEM micrographs of casein/PMMA core-shell particles stained with phosphotungstic acid (PTA)

Particle morphology studied by TEM reveals that the latex particles possess well-defined core-shell structures with casein as the hydrophilic shell and PMMA as the hydrophobic core (FIG. 6)

Figure 7:
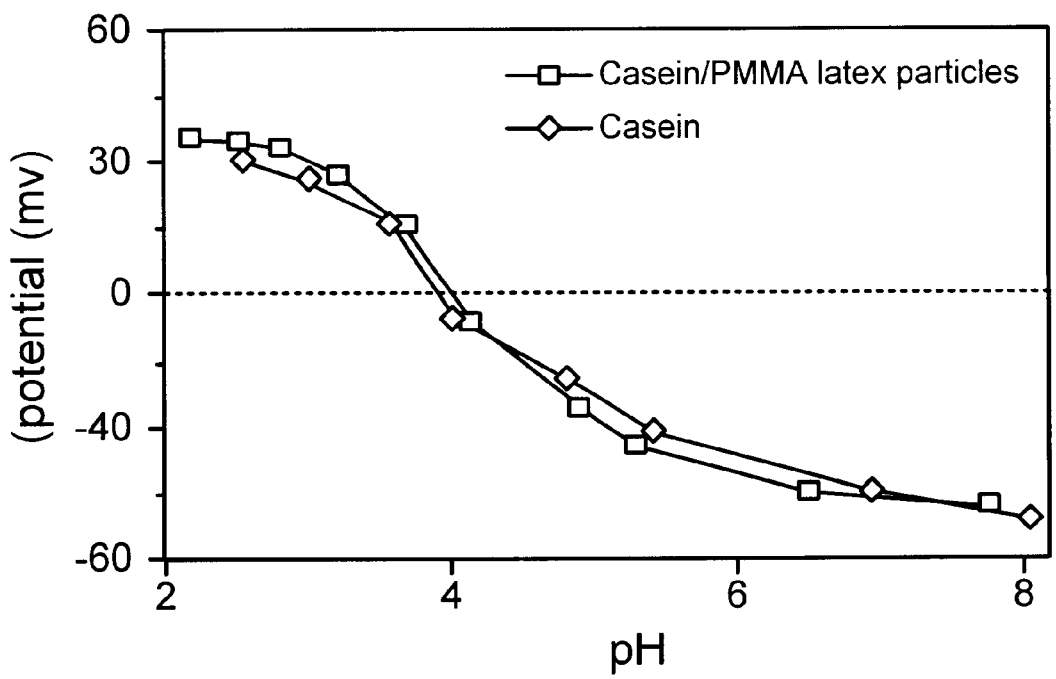
FIG. 7. pH dependence of zeta-potential of (■) casein/PMMA latexes; and (●) pure casein in 1 mM potassium chloride solution FIG. 8. FT-IR spectra of gelatin (A) and gelatin-g-PMMA (B).

Zeta ($\zeta$)-potential analysis indicated that these particles in a weak basic medium were negatively charged. The $\zeta$-potential was about −55 mV in 1 mM KCl solution, indicating that these particles were very stable. Furthermore, $\zeta$-potential recorded as a function of pH shows that the latex particles has an isoelectric point (IEP) of pH 4.1, very close to that of pure casein in the same solution (FIG. 7). The results clearly suggest that casein has been coated on the particle surface with little modification.

Gelatin/Poly(methyl methacrylate) Core-Shell Particles

Gelatine (1.0 g) was dissolved in distilled water at room temperature in a water-jacketed flask equipped with a thermometer, a condenser and a nitrogen inlet under magnetic stirring. The procedure is similar to the graft copolymerization of MMA onto casein except that gelatine was directly dissolved in water. The results are summarised in Table 7.

Figure 12:
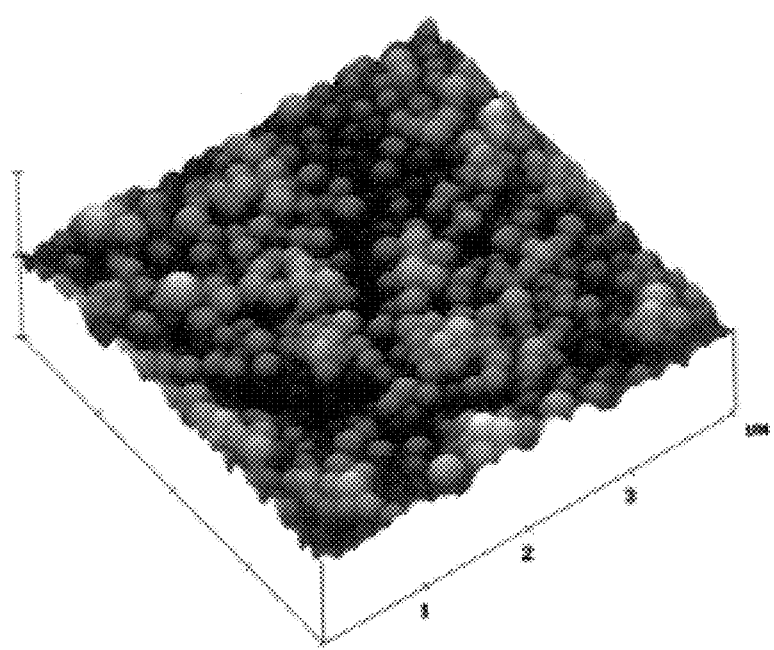
FIG. 12. Atomic force microscopic (AFM) image of the surface formed from Gelatin/PMMA Core-Shell latex particles FIG. 13. pH dependence of zeta-potential of gelatin/PMMA latex particles in 1 mM KCl aqueous solution FIG. 14. FT-IR spectra of BSA (A) and BSA-g-PMMA (B).

When a dilute latex emulsion of gelatine/PMMA was dispersed on a clean glass surface and allowed it to dry at room temperature. A thin layer of film was formed, which was subsequently analyzed by atomic force microscopy (AFM) (FIG. 12). The AFM picture again clearly demonstrates that particles are highly monodispersed, and have a clean surface.

TABLE 7

Graft Copolymerization of MMA onto Gelatine

| Weight ratio MMA:Gelatin | TBHP (mM) | Temp (° C.) | Conv. (%) | Grafting (%) | Grafting Efficiency (%) | $D_n$ (nm) | $D_n/D_v$ (nm) |
|---|---|---|---|---|---|---|---|
| 1:1 | 0.08 | 80 | 30.0 | 19.4 | 19.4 | 138 | 1.10 |
| 2:1 | 0.08 | 80 | 59.2 | 62.9 | 31.5 | 141 | 1.13 |
| 3:1 | 0.08 | 80 | 69.6 | 97.7 | 32.6 | 147 | 1.14 |
| 4:1 | 0.08 | 80 | 80.1 | 144.4 | 36.1 | 160 | 1.16 |
| 4:1 | 0.02 | 80 | 72.2 | 96.5 | 24.1 | 129 | 1.09 |
| 4:1 | 0.04 | 80 | 78.4 | 128.2 | 32.1 | 140 | 1.10 |
| 4:1 | 0.08 | 80 | 80.1 | 144.4 | 36.1 | 160 | 1.16 |
| 4:1 | 0.08 | 70 | 61.6 | 87.0 | 21.8 | 139 | 1.14 |
| 4:1 | 0.08 | 80 | 80.1 | 144.4 | 36.1 | 160 | 1.16 |
| 4:1 | 0.08 | 85 | 87.6 | 122.4 | 30.5 | 162 | 1.16 |

Results in Table 7 show that increasing the weight ratio of MMA to gelatine increased the conversion and grafting efficiency as well as the particle size while size distribution had little change. It was found that graft copolymerization MMA onto gelatine required less amount of TBHP to achieve high grafting conversion than casein. Reaction temperature was also found to affect the conversion and grafting efficiency. Reaction temperature at 80° C. appeared to be the most suitable temperature.

Figure 8:
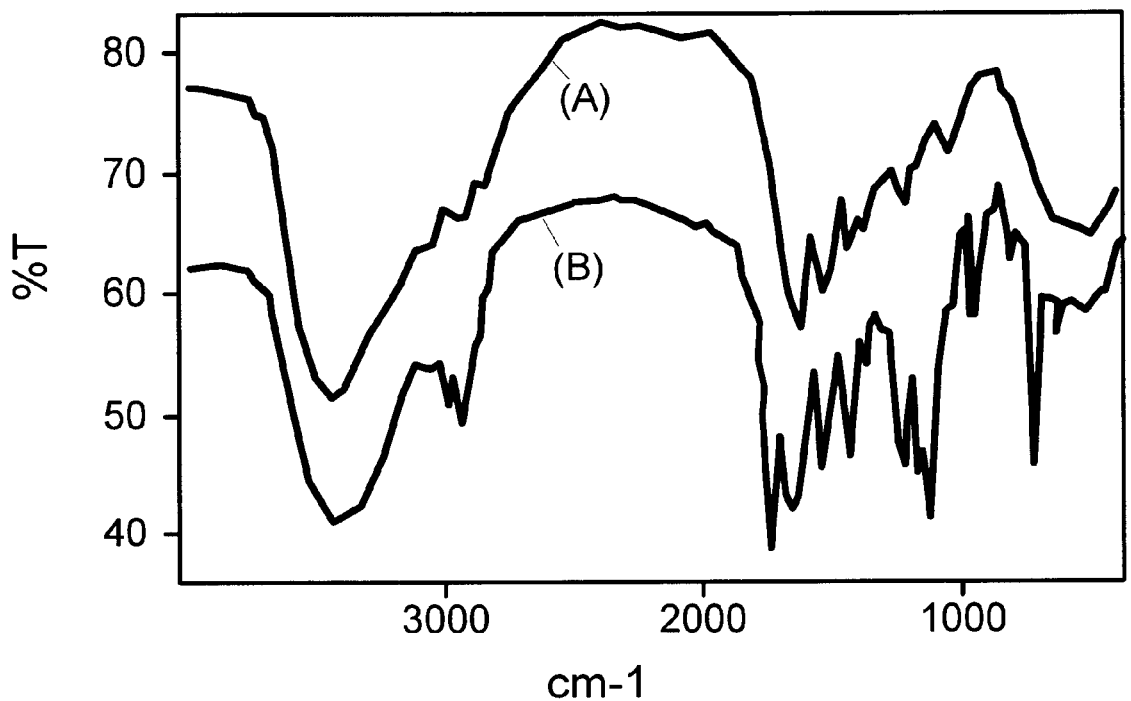

A strong carbonyl absorption peak at 1735 cm$^{-1}$ in the FTIR spectrum of gelatine-g-PMMA obtained after Soxhlet extraction evidently indicates that PMMA has been grafted onto the backbone of gelatine (FIG. 8).

Figure 9:
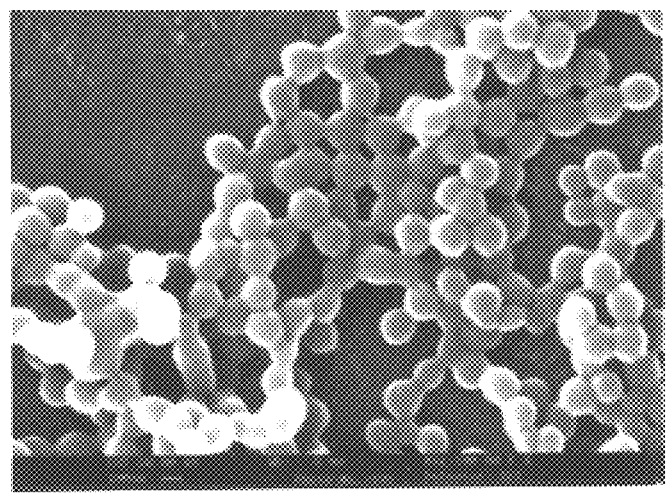
FIG. 9. Particle size and distribution of gelatin/PMMA latex particles
Figure 10:
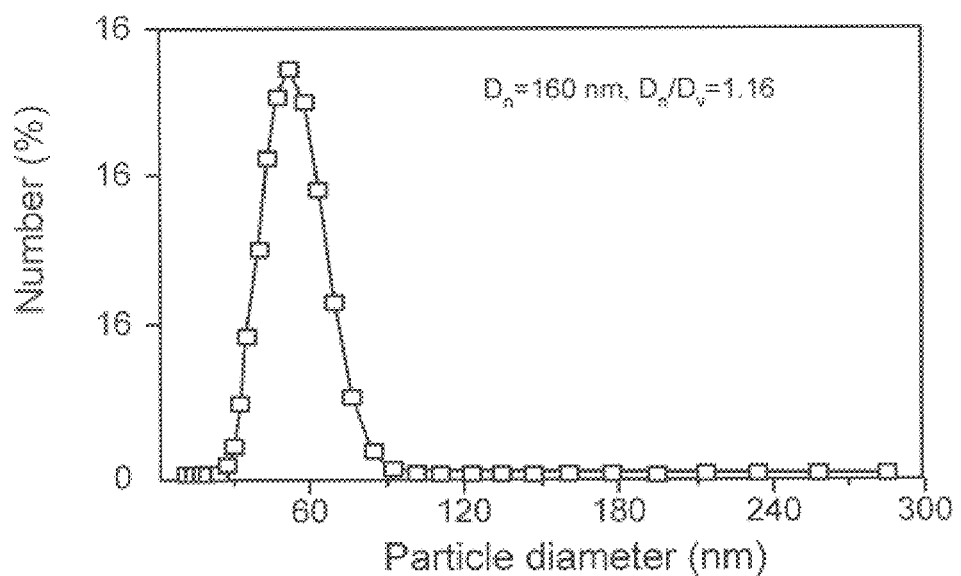
FIG. 10. SEM micrographs of gelatin/PMMA latex particles

The particle size of the gelatine/PMMA latexes was measured by Coulter LS230 Particle Size Analyzer and the mean particle size and size distribution were 160 nm in diameter and 1.16, respectively (FIG. 9). The average particle size is double the size of casein/PMMA particles. The result is in good agreement with SEM determination as shown in FIG. 10. Furthermore, the SEM micrographs clearly shows that the particles are highly monodispersed.

Figure 11:
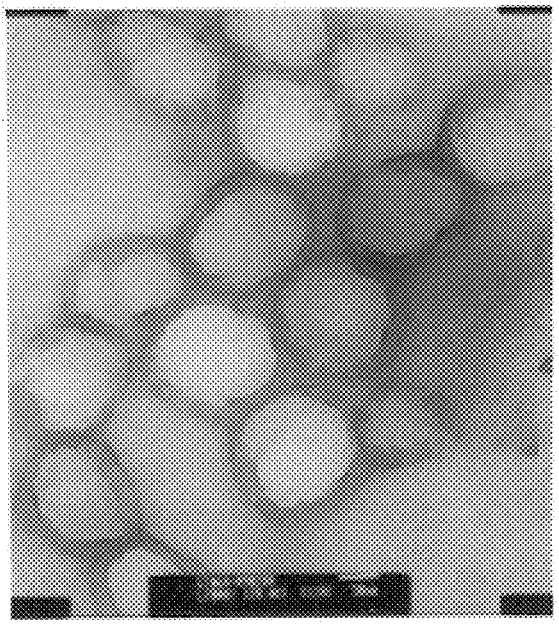
FIG. 11 TEM micrographs of gelatin/PMMA core-shell particles stained with RuO4

The core-shell morphology of the latex particles was examined by TEM. FIG. 11 shows that the latex particles possess a well-defined shell layer of gelatine on the particle surface.

Figure 13:
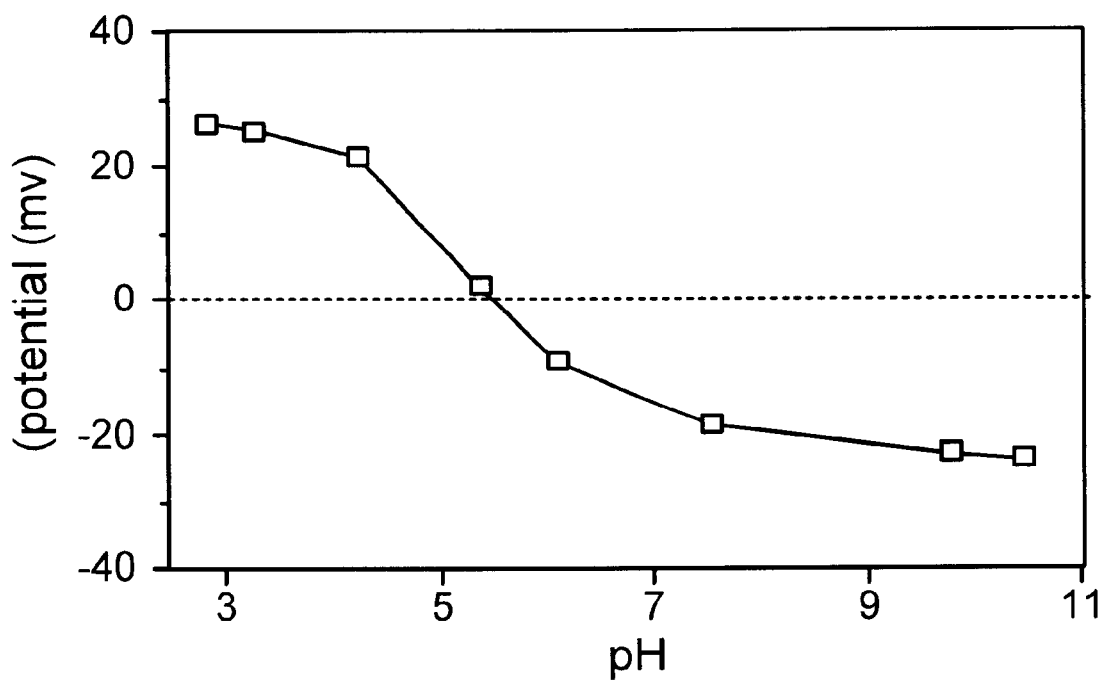

Zeta ($\zeta$)-potential analysis indicated that these particles in water were negatively charged and had a $\zeta$-potential of −15 mV in 1 mM KCl solution (pH=7). This value is lower than that of the casein/PMMA latexes, suggesting that the gelatine/PMMA latexes are less stable than the casein/PMMA one. Furthermore, $\zeta$-potential of the latexes as a function of pH shows an isoelectric point (IEP) of pH 5.4, which is very close to that of pure gelatine (FIG. 13). The result indicates that the gelatine is located on the shell layer of the particle with little property modification.

Bovine Serum Albumin (BSA)/Poly(methyl methacrylate) Core-Shell Nanoparticles

For a total 100 mL solution, bovine serum albumin bovine (1.0 g) dissolved in distilled water was charged to a water-jacketed flask equipped with a thermometer, a condenser and a nitrogen inlet under magnetic stirring. The solution was bubbled with nitrogen gas for 30 minutes to remove the dissolved oxygen. Purified MMA monomer (4 g, ratio of BSA to MMA=1:4) was added to the solution, followed by the addition of 1 mL of t-BuOOH solution (8×10$^{-3}$ M stock solution). The reaction was continued for 2 hours at 80° C. under nitrogen. White emulsion was observed after 15–30 minutes reaction. Results are summarized in Table 8.

TABLE 8

Graft Copolymerization of MMA onto BSA

| Weight ratio MMA:BSA | TBHP (mM) | Temp (° C.) | Conv. (%) | Grafting (%) | Grafting Efficiency (%) | $D_n$ (nm) | $D_n/D_v$ (nm) |
|---|---|---|---|---|---|---|---|
| 4:1 | 0.12 | 60 | 1.1 | — | — | — | — |
| 4:1 | 0.12 | 70 | 52.0 |  |  | 61 | 1.15 |
| 4:1 | 0.12 | 75 | 72.9 |  |  | 63 | 1.17 |
| 4:1 | 0.12 | 80 | 95.1 | 198.9 | 52.3 | 62 | 1.17 |
| 4:1 | 0.02 | 80 | 62.7 |  |  |  |  |
| 4:1 | 0.04 | 80 | 67.0 | 105.6 | 39.5 | 66 | 1.20 |
| 4:1 | 0.08 | 80 | 81.6 | 205.5 | 63.0 | 63 | 1.18 |
| 4:1 | 0.12 | 80 | 95.1 | 198.9 | 52.3 | 62 | 1.17 |
| 4:1 | 0.16 | 80 | 93.4 | 206.0 | 55.2 | 63 | 1.17 |

Results in Table 8 show that reaction temperature has a considerable effect on the conversion. The reaction should be raised to 80° C. in order to obtain a nearly complete conversion in 2 hours. TBHP concentration equal to 0.12 mM was found to be the most suitable concentration to achieve high conversion and grafting efficiency. Furthermore, the grafting percentage and efficiency of MMA onto BSA are generally found to be higher than that of casein and gelatine.

Figure 14:
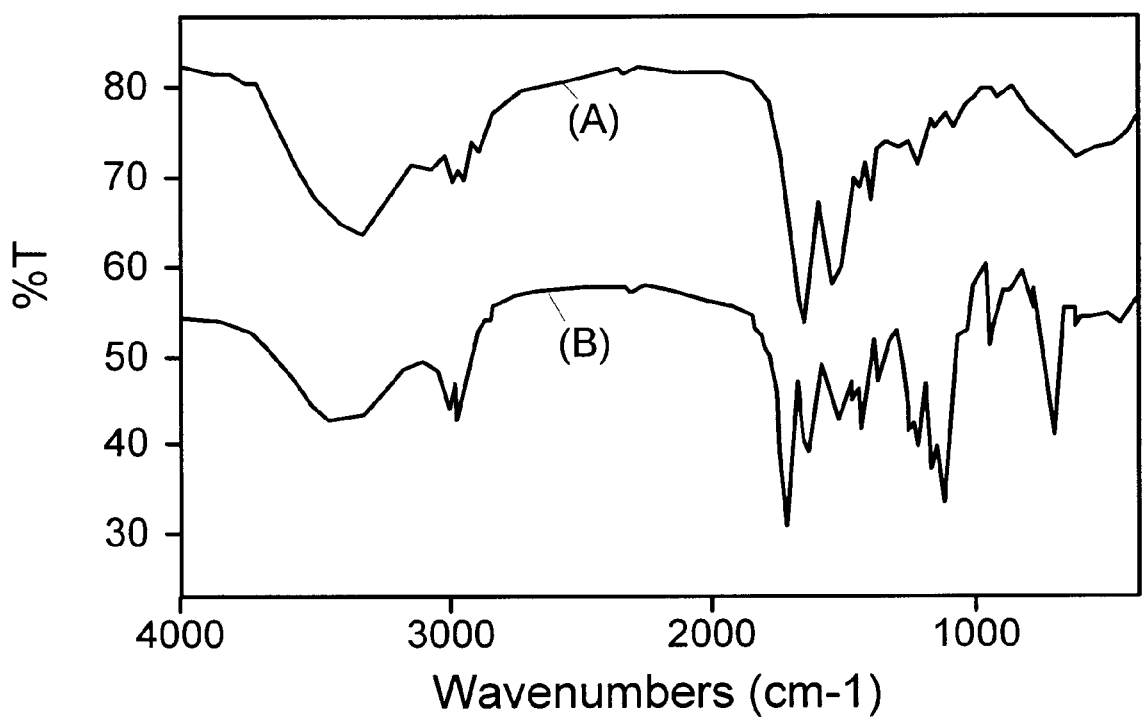

A strong carbonyl absorption peak at 1735 cm$^{-1}$ in the FTIR spectrum of BSA-g-PMMA obtained after Soxhlet extraction evidently indicates that PMMA has been grafted onto the backbone of BSA (FIG. 14).

Figure 15:
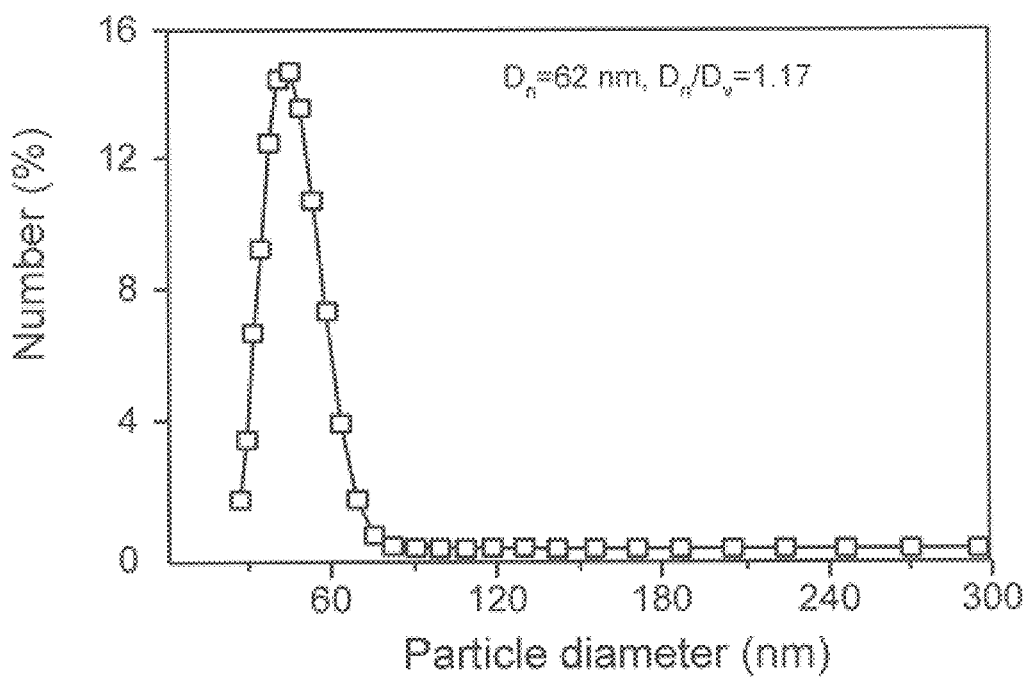
FIG. 15. Particle size and distribution of BSA/PMMA latex particles
Figure 16:
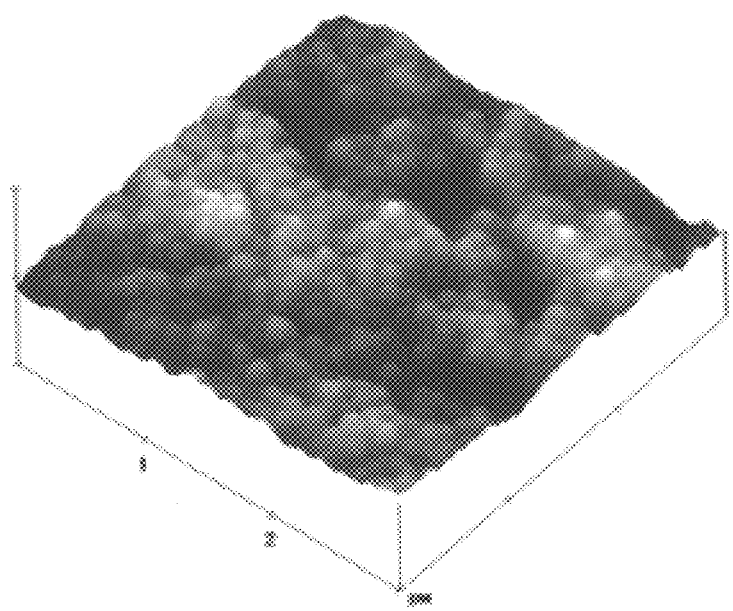
FIG. 16. Atomic force microscopic (AFM) image of the surface formed from BSA/PMMA Core-Shell latex particles FIG. 17. pH dependence of Zeta-potential of BSA/PMMA latex particles initiated by TBHP at 80° C. (IEP=5.0)

The particle size of the BSA/PMMA latexes was measured by Coulter LS230 Particle Size Analyzer and the mean particle size was 60–70 nm in diameter with narrow distribution (FIG. 15). Morphology of BSA/PMMA latex particles was also examined by atomic force microscopy (FIG. 16).

Figure 17:
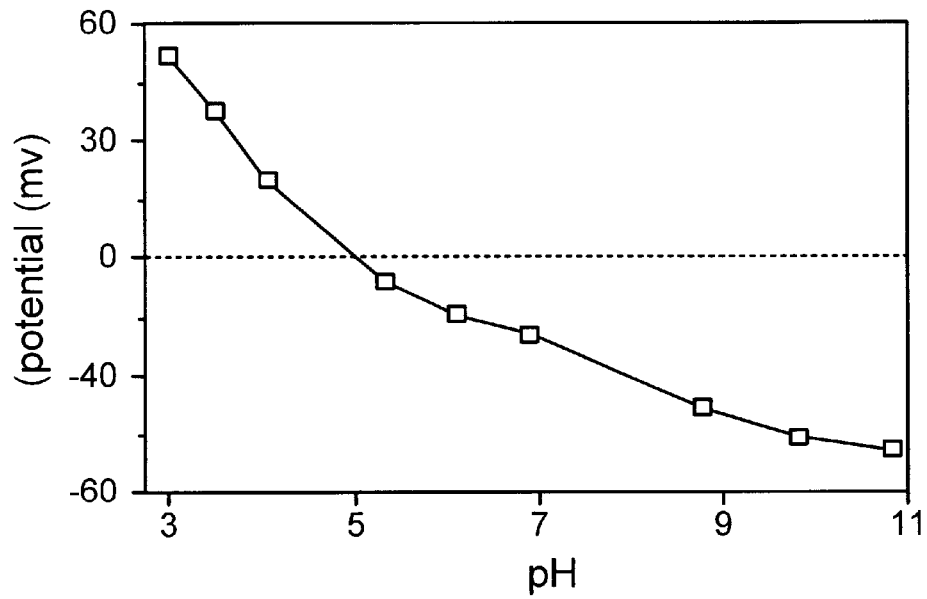

Zeta (ζ)-potential analysis as shown in FIG. 17 indicates that BSA/PMMA particles in water are negatively charged at neutral pH. The ζ-potential is about −20 mV in 1 mM KCl solution, indicating that these particles are very stable. Furthermore, ζ-potential of the latexes as a function of pH shows an isoelectric point (IEP) of pH 5.0, which is very close to that of BSA. The result obviously indicates that the BSA is located on the shell layer of the particle with little property modification.

Chitosan/Poly(methyl methacrylate)

To a 100 ml of solution, chitosan (1.0 g) was dissolved in distilled water containing 2.0 g of acetic acid at 50° C. in a water-jacketed flask equipped with a thermometer, a condenser and a nitrogen inlet under magnetic stirring. The reaction procedure was similar to the graft copolymerization of MMA onto the casein described in 3.1. Results are summarized in Table 9:

ROOH can be catalytically decomposed with the acid. Thus radicals could be generated without interacting with the amine groups on chitosan. This effect also explains why the reaction could occur at low temperature.

Figure 18:
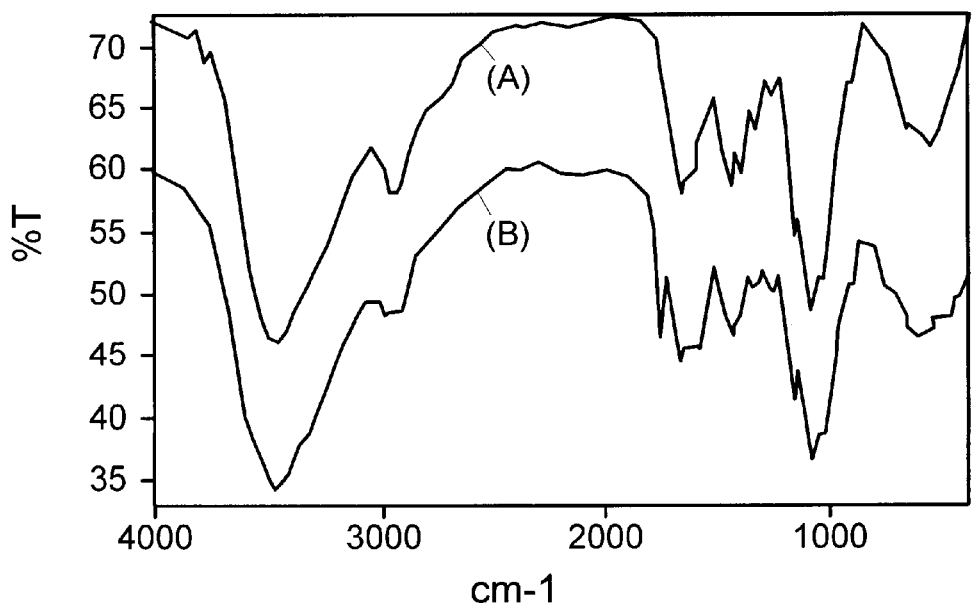
FIG. 18. FT-IR spectra of (A) chitosan, and (B) chitosan-g-PMMA

Chitosan-g-PMMA was isolated by a Soxhlet extraction of the resulting polymer. A medium carbonyl absorption peak at 1735 cm$^{-1}$ in the FTIR spectrum evidently indicates that some PMMA was grafted onto the chitosan backbone (FIG. 18)

Figure 19:
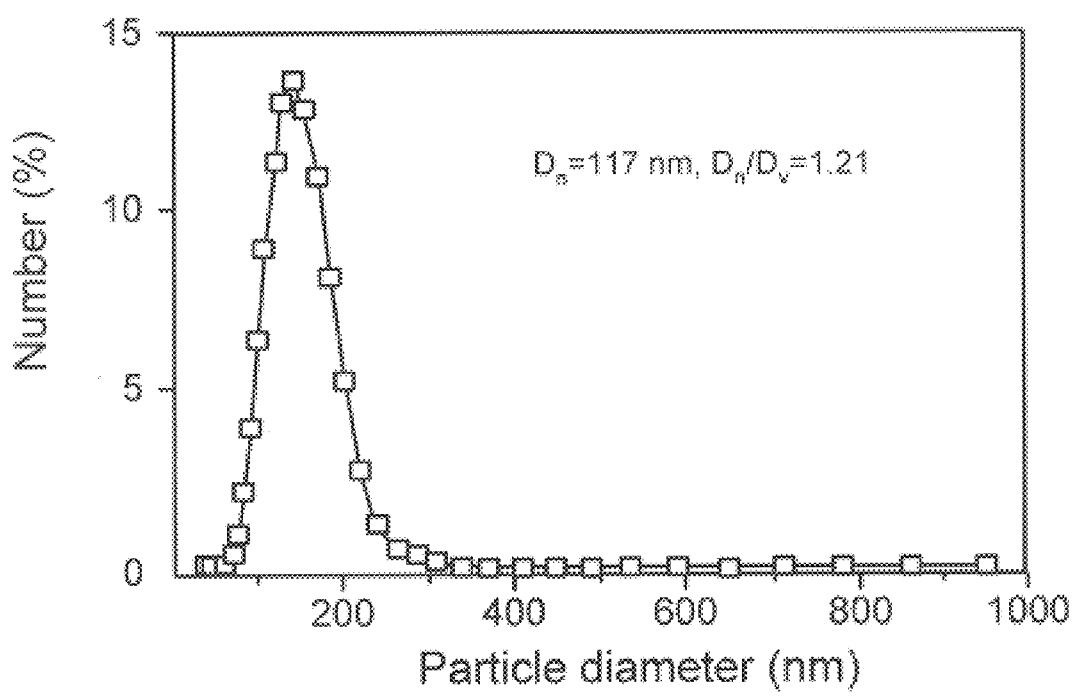
FIG. 19. Particle size and distribution of chitosan/PMMA latex particles
Figure 20:
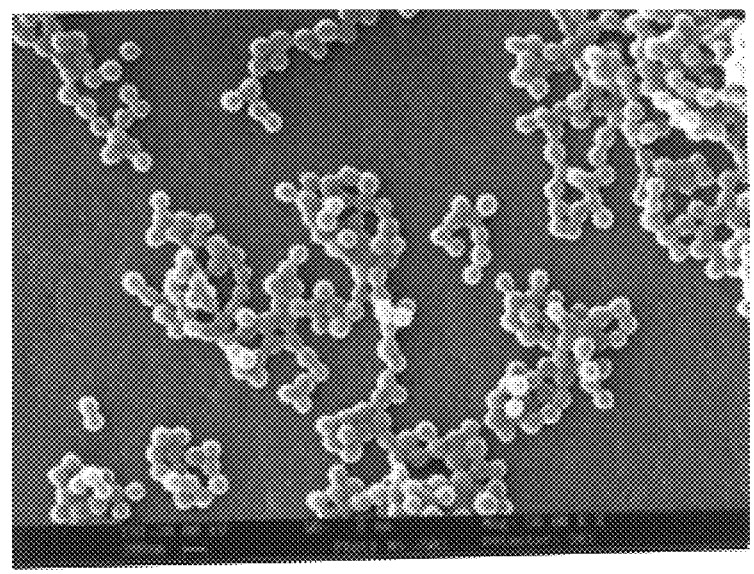
FIG. 20. SEM micrographs of chitosan/PMMA core-shell latex particles

Particle sizes and their distribution were measured by a Coulter LS230 Particle Size Analyzer. The mean particle sizes were ranged from 117 nm in diameter with very narrow size distribution (FIG. 19), which was further confirmed by the SEM (FIG. 20).

The morphology of chitosan/PMMA latexes will be examined by the TEM in order to observe the well-defined core-shell structures with chitosan as the hydrophilic shell and PMMA as the hydrophobic core.

Figure 21:
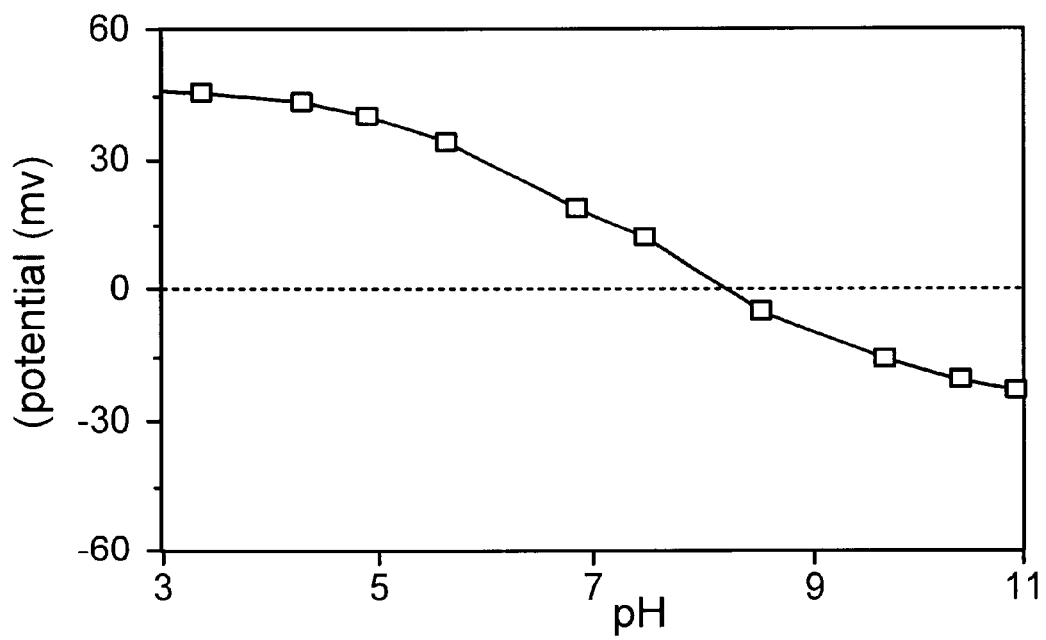
FIG. 21. pH dependence of zeta-potential of chitosan/PMMA latex particles in 1 mM potassium chloride aqueous solution FIG. 22. Light transmittance of 0.2% solution of chitosan-modified PNIPAM in DI water vs. temperature FIG. 23. FTIR spectrum of PEI-g-PMMA FIG. 24. Particle size and distribution of PEI/PMMA latex particles FIG. 25. SEM micrographs of PEI/PMMA core-shell latex particles FIG. 26. TEM micrographs of PEI/PMMA core-shell latex particles stained with phosphotungstic acid (PTA)

Zeta (ζ)-potential analysis (FIG. 21) indicates that the chitosan/PMMA particles in acetic solution were positively charged and have a ζ-potential of about 42 mV in acidic solution. Furthermore, ζ-potential as a function of pH shows that the latex particle has an isoelectric point (IEP) of pH 8.2, which is very close to that of chitosan. This result clearly indicates that the chitosan is located on the surface of the particle.

Chitosan/Poly(N-isopropyl acrylamide)

The experiment was carried out at 70° C. as described by solution polymerization in benzene initiated by AIBN using weight ratio of NIPAM and chitosan equal to 4:1. The graft copolymers were isolated by Soxhlet extraction with acetone, and the structure was confirmed by $^1$H-NMR. Result shows that only a trace amount of TBHP (0.08 mM) was needed to effectively induce the graft copolymerization of NIPAM onto chitosan, giving near complete conversion and 266% of grafting percentage (Table 10). The grafting

TABLE 9

Graft Copolymerization of MMA onto Chitosan

| Weight ratio MMA:CTS | TBHP (mM) | CHP (mM) | Temp (° C.) | Conv. (%) | Grafting (%) | Grafting efficiency (%) | $D_n$ (nm) | $D_n/D_v$ (nm) |
|---|---|---|---|---|---|---|---|---|
| 2:1 | 0.08 | | 70 | 64.0 | 37.6 | 18.8 | 111 | 1.23 |
| 4:1 | 0.08 | | 70 | 93.4 | 52.2 | 13.1 | 117 | 1.21 |
| 6:1 | 0.08 | | 70 | 93.9 | 70.4 | 11.7 | 128 | 1.44 |
| 4:1 | 0.08 | | 40 | 73.2 | 76.3 | 19.1 | 165 | 1.52 |
| 4:1 | 0.08 | | 60 | 96.3 | 80.2 | 20.1 | 144 | 1.21 |
| 4:1 | 0.08 | | 80 | 98.0 | 69.5 | 17.4 | 131 | 1.11 |
| 4:1 | | 0.04 | 70 | 85.0 | 48.6 | 12.1 | 115 | 1.33 |
| 4:1 | | 0.08 | 70 | 97.1 | 54.2 | 13.6 | 123 | 1.21 |
| 4:1 | | 0.12 | 70 | 94.5 | 46.0 | 11.5 | 129 | 1.25 |

Figure 22:
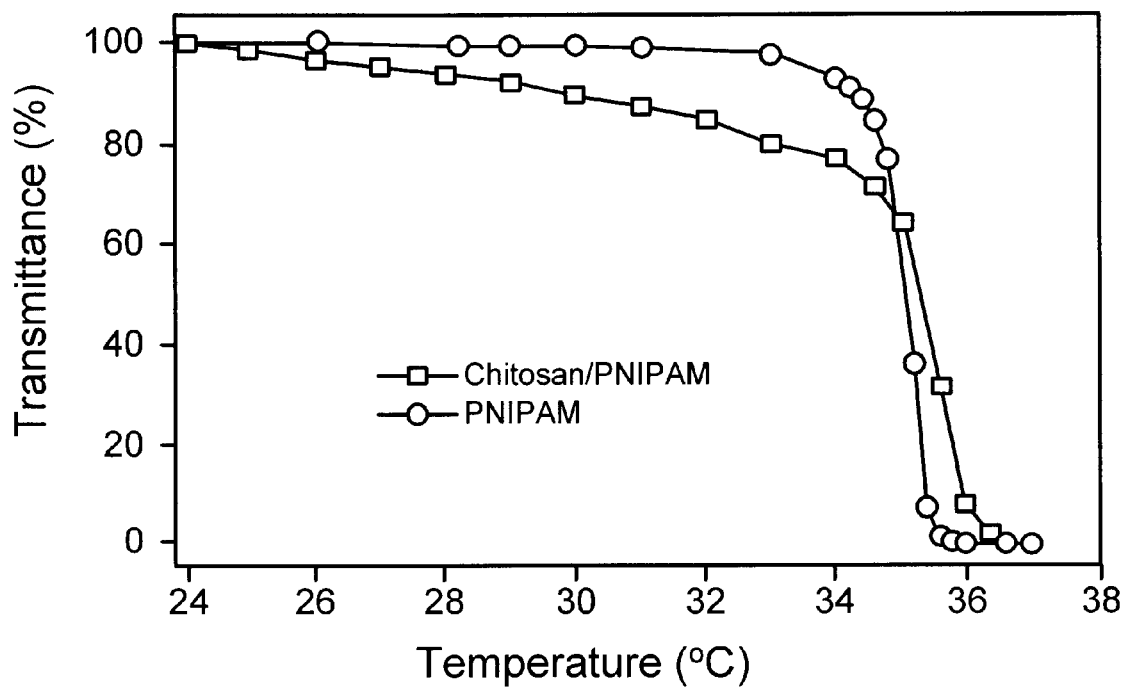

These results show that only a trace amount of either TBHP or CHP was needed to effectively induce the graft copolymerization of MMA onto chitosan. Increasing the MMA to chitosan weight ratio from 2:1 to 4:1 increased the conversion and grafting percentage. The reaction temperature was found to be lower than grafting onto proteins. For example, 73% MMA conversion could be achieved at 40° C. in chitosan, while no reactions took place for other proteins. When using cumene hydroperoxide instead of t-butyl hydroperoxide, comparable results were obtained under similar conditions. One major problem in this system is the low grafting efficiency. In other words, a large amount of homopolymer was formed during the reaction. The higher conversion to homopolymer is mainly due to the fact the efficiency was 67%, which was much higher than the graft copolymerization of a hydrophobic monomer such as MMA. This is probably attributed to water solubility of the N-isopropylacrylamide monomer, which leads to a better reaction between chitosan, t-BuOOH and NIPAM in aqueous. The resultant product is a solution at room temperature and shows thermal sensitive property with the Lower Critical Solution Temperature (LCST) of 34.5° C. in distilled water (FIG. 22, Chitosan/PNIPAM, where chitosan=0.5 wt %, NIPAM=2 wt %, [TBHP]=0.08 mM, [AcOH]=1%, 70° C., 5 hr). The slight increase of LCST is resulted from the chemical linkage of the hydrophilic chitosan onto poly (NIPAM).

TABLE 10

Graft Copolymerization of NIPAM onto chitosan

| Weight ratio NIPAM:CTS | TBHP (mM) | Temp (° C.) | Conv. (%) | Grafting (%) | Grafting Efficiency (%) |
|---|---|---|---|---|---|
| 1:1 | 0.08 | 70 | 83.4 | — | — |
| 2:1 | 0.08 | 70 | 93.9 | — | — |
| 3:1 | 0.08 | 70 | 96.2 | — | — |
| 4:1 | 0.08 | 70 | 98.9 | 269 | 67 |
| 5:1 | 0.08 | 70 | 99.8 | — | — |

Hydrophobic-Hydrophilic Core-Shell Latexes
Poly(ethyleneimine)/Poly(methyl methacrylate)

Poly(ethyleneimine) (PEI) (2.0 g, 50% solution, Mw 50,000 to 60,000) diluted in distilled water were placed in a water-jacketed flask equipped with a thermometer, a condenser and a nitrogen inlet under magnetic stirring. The reaction procedure was similar to the graft copolymerization of MMA onto casein. Results are shown in Table 11:

TABLE 11

Graft copolymerization of MMA onto PEI

| Weight ratio MMA:PEI | TBHP (mM) | Temp (° C.) | Conv. (%) | Grafting (%) | Grafting Efficiency (%) | Dn (nm) | PD |
|---|---|---|---|---|---|---|---|
| 4:1 | 0.08 | 50 | 34.0 | — | — | 134 | 1.13 |
| 4:1 | 0.08 | 60 | 80.0 | 210.2 | 62.5 | 130 | 1.11 |
| 4:1 | 0.08 | 70 | 88.3 | 130.4 | 32.6 | 120 | 1.11 |
| 4:1 | 0.08 | 80 | 95.5 | 187.2 | 46.8 | 132 | 1.12 |
| 4:1 | 0.20 | 80 | 87.5 | 193.8 | 55.4 | 124 | 1.10 |

These results in Table 11 show that only a trace amount of TBHP was required to effectively induce the graft copolymerization of MMA onto PEI. Near quantitative conversion was achieved in 2 hours at 80° C. When increasing MMA to PEI ratios to 5:1 and 6:1, high conversions were still obtained. But the particles became less stable. Some precipitates started to appear. Thus MMA to PEI ratio of 4:1 seemed to be the most suitable ratio for the reaction.

When the latex dispersion was dried on a glass surface, a water-clear film developed. Interesting, this film could be redispersed back to the white emulsion after it was immersed in water.

Figure 23:
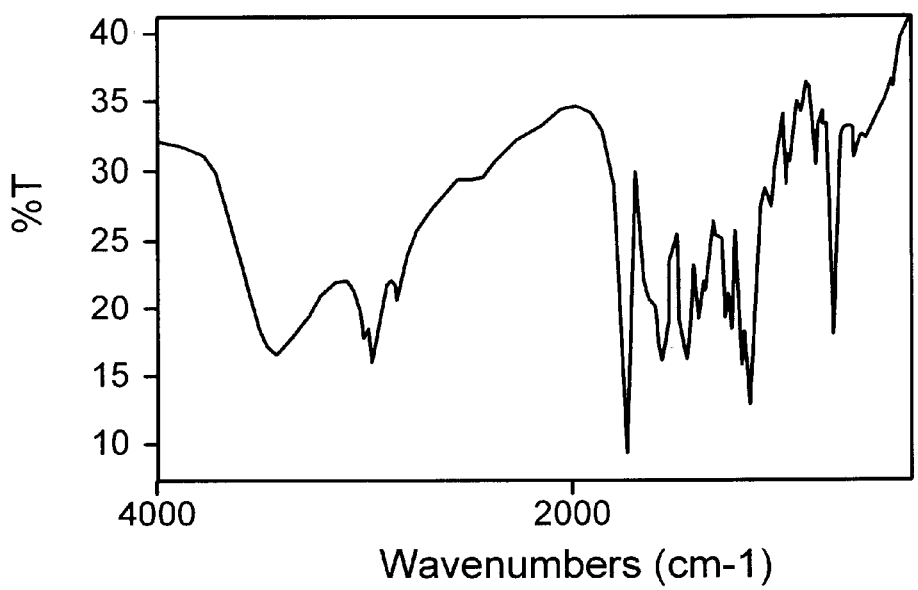

The PEI-g-PMMA was isolated by Soxhlet extraction with chloroform. The grafted copolymer shows a very strong carbonyl absorption peak of 1735 cm$^{-1}$ in the FTIR spectrum, indicating that high quantity of PMMA has been grafted on the PEI backbone (FIG. 23).

Figure 24:
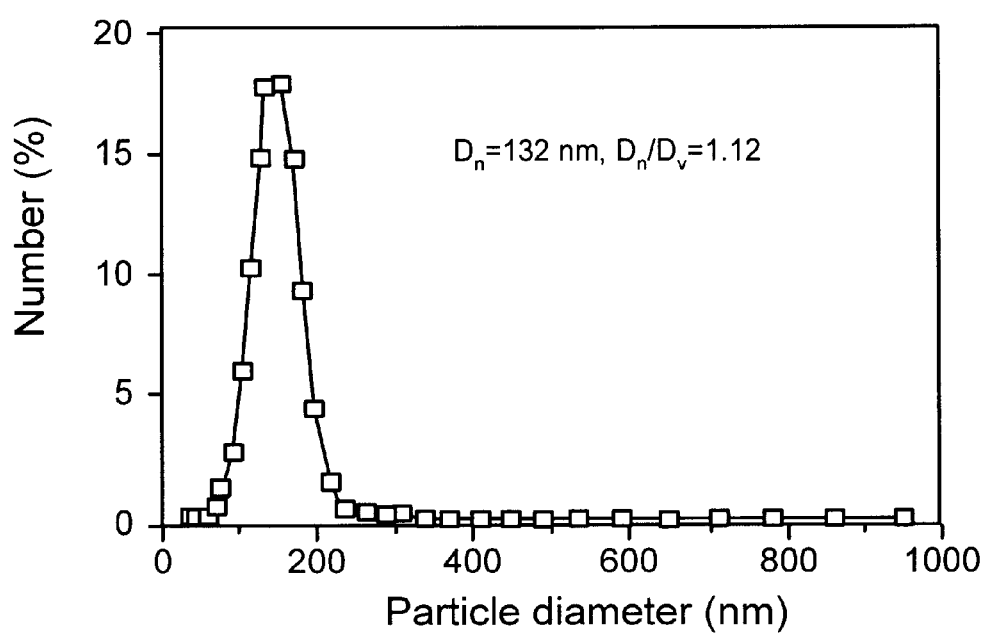
Figure 25:
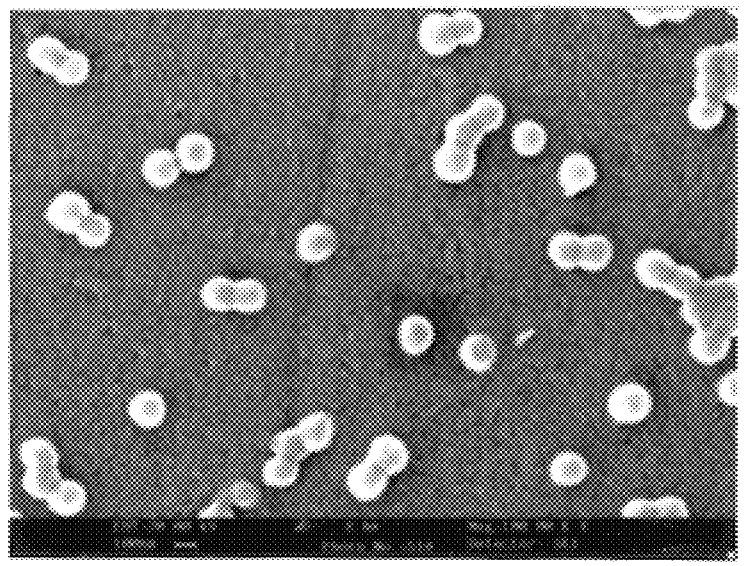

Particle sizes were measured using a Coulter LS230 Particle Size Analyzer. The mean particle sizes ranged from 120 to 140 nm in diameter, with very narrow distribution (FIG. 24), which was further confirmed by SEM (FIG. 25).

Figure 26:
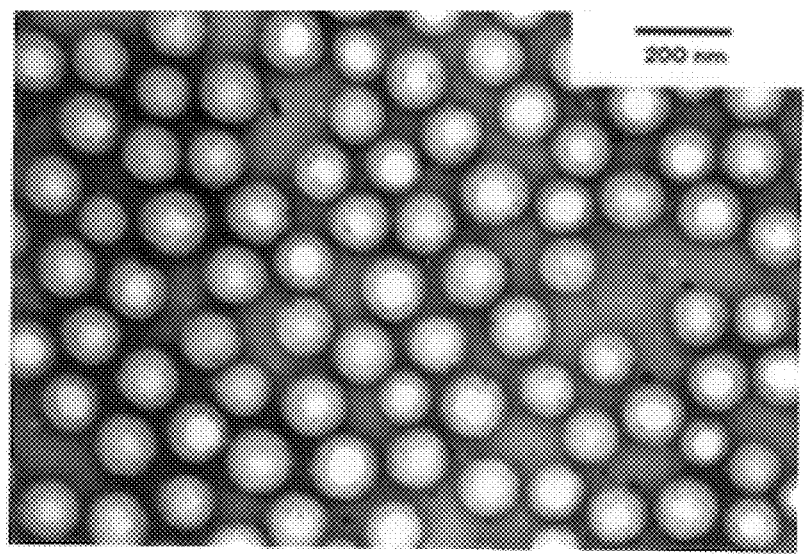

The morphology observed by TEM (FIG. 26) reveals that the latex particles possess well-defined core-shell structures with PEI as the hydrophilic shell and PMMA as the hydrophobic core.

Figure 27:
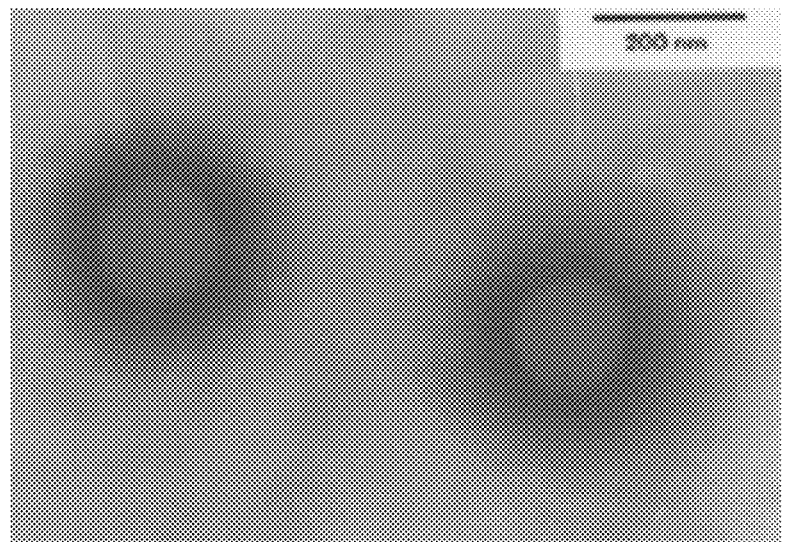
FIG. 27. TEM micrographs of PEI/PMMA core-shell latex particles stained with phosphotungstic acid (PTA)

A closer look of the PEI/PMMA core-shell particles as shown in FIG. 27 reveals that the particles have rough surface texture, indicating the hydrophilic PEI tends to extend to water.

Figure 28:
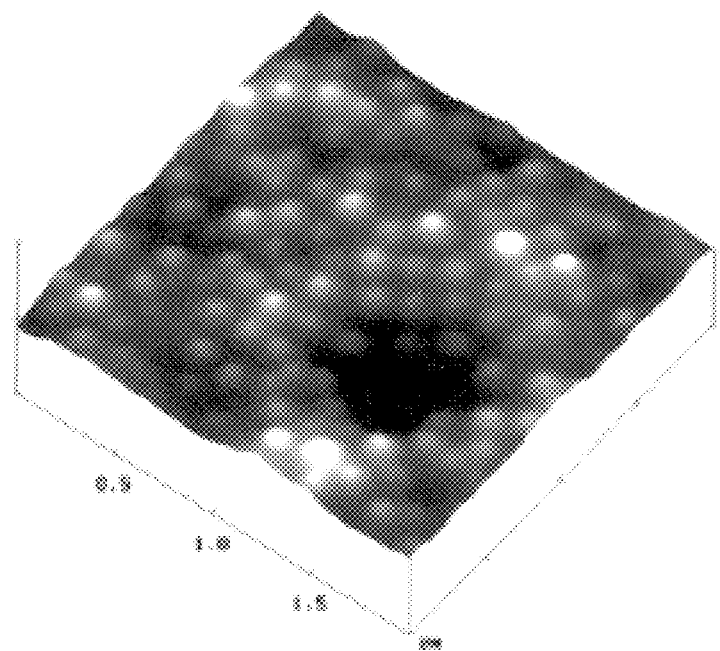
FIG. 28. Atomic force microscopic (AFM) image of the surface formed from PEI/PMMA Core-Shell latex particles FIG. 29. pH dependence of ζ potential of PEI/PMMA latex particles in 1 mM potassium chloride aqueous solution
Figure 29:
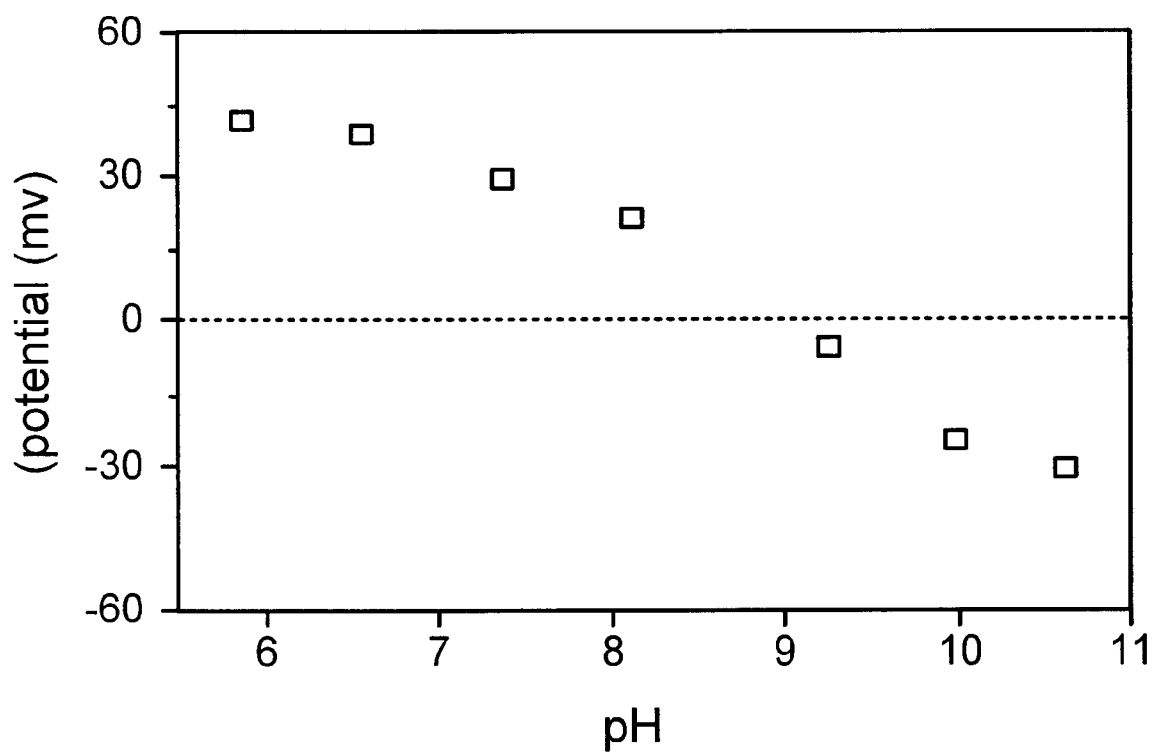

Atomic force microscope (FIG. 28) demonstrates that PEI/PMMA core-shell particles tend to separate from each other. This observation evidently explains why PEI/PMMA particles could be readily redispersed in water to form an emulsion after forming a film.

ζ-Potential analysis indicates that these particles in distilled water are positively charged and have a ζ-potential of about 30 mV in 1 mM KCl solution under neutral pH. Furthermore, ζ-potential as a function of pH shows that the latex particle has an isoelectric point (IEP) of pH 9.0, which is close to that of PEI (FIG. 29). This result strongly suggests that the particle surface are fully covered by PEI.

Poly(acrylamide-co-acrylic acid)/Poly(methyl methacrylate)

Although graft copolymerization of MMA with TBHP in the presence of either polyacrylamide or polyacrylic acid homopolymer gave less than 10% MMA conversion, use of a poly(acrylamide-co-acrylic acid) sodium salt [poly(AA-co-AC) surprisingly resulted in 58% conversion with 75% grafting.

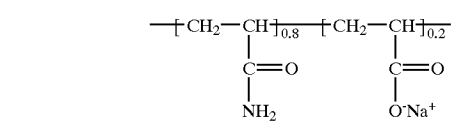

poly(acrylamide- co-acrylic acid) sodium salt

The grafting efficiency was 33%. Furthermore, mean particle size obtained was 134 nm in diameter with very narrow particle size distribution (PD=1.12). When the latexes were dried under air at room temperature, a white thin firm was developed which could be applied as a hard coating.

Beside MMA, 2-ethylhexyl acrylate was examined in the presence of poly(AA-co-AC).

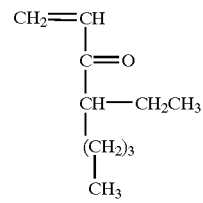

2-ethylhexyl acrylate

Conversion of 2-ethylhexyl acrylate was up to 75%, forming stable white latexes. When the latex emulsion was dried under air at room temperature, a water-clear, flexible and sticky thin film was developed. This kind of thin film may find potential applications in coatings.

Poly(vinylpyrrolidone)/Poly(methyl methacrylate)

Poly(vinylpyrrolidone) (PVP) is a water-soluble and biocompatible polymer.

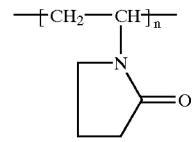

poly(vinylpyrrolidone

PVP has been extensive use in a variety of biomedical applications. When graft copolymerization induced by TBHP was carried out in the presence of PVP solution (pH=5.11), only 8% MMA conversion was obtained after 2 hours at 80° C. Furthermore, particles formed were not stable, and precipitated out during the reaction. In order to increase the particle stability, some charges on the particle surface was introduced by partial hydrolysis of PVP. After PVP reacting with base at 50° C. for overnight, the pH of the solution dropped from 11.04 to 10.30, indicating that a small amount of PVP was hydrolyzed. Graft copolymerization of MMA in this base PVP solution was slightly improved to 12.5% MMA conversion.

The neutral conditions of PVP solution were also prepared using two approaches: 1) Neutralizing the hydrolyzed PVP solution to pH=7.03 from 10.3; 2) Direct neutralizing (pH=6.96) the freshly dissolved PVP in water (pH ~5). It was found that method 1 and 2 gave 37% and 26% conversion of MMA, respectively.

PVP is thus not a favorable hydrophilic polymer because it contains a tertiary amide and is lack of charges to stabilize the particles. On the other hand, under neutral condition, MMA conversion can be improved up to 37%.

The core-shell particles of the invention are expected to find application in many areas, and we now give a few specific ideas.

Targeted-Drug Delivery

Drug delivery systems that are highly specific to precisely targeted parts of the body are one of the top strategic technologies in the next decade. Use of polymeric nano- and microparticles as carriers is currently the most advanced strategy in biopharmaceutics for drug delivery of anticancer and oral peptide drugs. The purpose is to improve the bioavailability of drugs with poor absorption characteristics, to deliver vaccine antigens to the gut-associated lymphoid tissues, to control the release of drugs, to reduce the gastrointestinal GI mucosa irritation caused by them and to ensure their stability in the GI tract. According to the present invention, we provide particles useful as drug carries. When these particles are mixed with the hydrophilic drugs in water, it is expected that the hydrophilic shell can effectively retain the hydrophilic drugs by interaction with them.

One major challenge in the development of particulate drug carriers for targeting at specific body sites is the preparation of optimum size particles with hydrophilic surface so as to have long circulation time in blood and an escape from the RES scavenging. In our systems, the size of biopolymer-polymer colloidal particles is generally less than 200 nm in diameter and the particles have a hydrophilic surface. Thus it is expected that these particles will find applications in targeted drug delivery. (Rembaum, A.; Dreyer, W. J. Science, 208, 364 (1980), In Antibodies: A Practical Approach; Catty, D.; Raykundalla, C., Eds.; IRL Press: Oxford, Vol II, p97 (1989).

Diagnostic Testings (PEI/PMMA)

The antibodies/polymer core-shell microspheres can be used for diagnostic tests for the detection of antibodies in various body fluids (e.g. in blood serum or urine). The simplest agglutination test consists of mixing a droplet of suspension of microspheres on a slide with a droplet of liquid to be analyzed. When antigens are present, the interactions of antigens with the antibodies on the particle surface result in the aggregation of microspheres which can be observed by the naked eye or monitored quantitatively by any physicochemical method sensitive to the size aggregates, e.g. turbidity.

Agglutination Tests

In the field of diagnostics, polymer particles with surface functional groups such as aldehyde and activated esters of carboxylic acid groups have been widely used to immobilize antibodies via amino groups of the antibody. However, the amino groups are randomly distributed along an antibody molecule, thus antibodies are often found to immobilize the wrong way resulting in a loss of immunological activity. On the other hand, on their Fc regions, antibodies bear carbohydrates which can be converted to aldehyde groups on oxidation with potassium periodate. Thus amino functionalized particles are more effective to perform an orientated coupling of antibodies. In our present invention, we are able to prepare poly(ethyleneimine)/PMMA nanoparticles with high particle stability. High density of amino groups on the particle surface will certainly enhance the binding efficiency.

Gene Delivery

Gene therapy promises to revolutionize medicine by treating the cause of disease rather than the symptoms. Transfection is most efficient only when particles are cationic because they can bind DNA by electrostatic interaction. Among various cationic polymers, polyethyleneimine has appeared to be the most advanced delivery system of type, giving significant transfection. We are currently investigating the transfection and expression of genes into mammalian cells using our latex particles, particularly the cationic ones such as PEI/PMMA and chitosan/PMMA latexes.

Water Treatment

Chitosan/polymer latexes could be used in wastewater treatment for adsorption and desorption of heavy metal ions as well as acid and basic dyes.

Water-Boron Coatings and Others

Core-shell latexes of casein/PMMA or other polymer will find potential applications in leather finishing, paints, paper and textile industrials Other areas of interest include bioadhesives (chitosan/polymer), and enzyme-based catalyst (enzyme/polymer latexes).

What is claimed is:

1. A process of forming a well-defined amphiphilic core-shell emulsion polymer, the process comprising treating a water-soluble polymer containing amino groups with a small amount of alkyl hydroperoxide in the presence of a vinylic monomer.

2. The process as defined in claim 1, comprising generating radicals on nitrogen atoms of the water-soluble polymer, and then initiating free-radical polymerization of said vinylic monomer, whereby a vinylic polymer separates to form a latex of highly monodisperse core-shell particles with a hydrophobic polymer as the core and a hydrophilic polymer as the shell.

3. The process as defined in claim 2, wherein the core of said amphiphilic core-shell emulsion polymer comprises a hydrophobic grafted copolymer and a hydrophobic homopolymer, and said shell to which said hydrophobic polymer is grafted is a hydrophilic, nitrogen-containing polymer.

4. The process as defined in claim 3, wherein the nitrogen of said hydrophilic, nitrogen-containing polymer is present as an amino group.

5. The process as defined in claim 1, wherein said water-soluble polymer is selected from natural and synthetic water-soluble polymers containing amino groups.

6. The process as defined in claim 3, wherein said hydrophilic, nitrogen-containing polymer is selected from the group consisting of polyethyleneimine, and other synthetic amino polymers; chitosan and other N-acetyl sugars; and casein, gelatine, bovine serum albumin and other proteins.

7. The process as defined in claim 2, wherein the monomer forming the core portion of the core-shell particles is selected from the group consisting of a hydrophobic vinylic monomer, an acrylate monomer, an acrylamide monomer, polymerizable nitrile, acetate, and chloride monomers, a styrenic monomer, and a diene monomer; where the weight % of the monomer is from 25 to 95% of the total core-shell emulsion polymer weight.

8. The process as defined in claim 1, wherein said vinylic monomer has the formula $R^1R^2C=CH_2$, where $R^1$ is hydrogen or alkyl and $R^2$ is alkyl, aryl, heteroaryl, substituted aryl, halo, cyano, or another suitable hydrophobic group.

9. The process as defined in claim 1, wherein said vinylic monomer has the formula $CH_2=CR^3COOR^4$, where $R^3$ is hydrogen or alkyl and $R^4$ is alkyl or substituted alkyl or another suitable hydrophobic group.

10. The process as defined in claim 1, wherein said vinylic monomer is of formula $CH_2=CR^3COONHR^4$, where $R^3$ is hydrogen or alkyl and $R^4$ alkyl or substituted alkyl, or another suitable hydrophobic group such that the monomer is water insoluble.

11. The process as defined in claim 1, wherein said vinylic monomer is of the formula $CH_2=CR^1-CH=CH_2$, where $R^1$ is hydrogen, alkyl, or chloro.

12. The process as defined in claim 1, wherein a particle size of the amphiphilic core-shell particles is less than 200 nm, measured as $D_n$, a number average diameter.

13. The process as defined in claim 1, wherein the amphiphilic core-shell particles has a narrow size distribution, where $D_v/D_n$ is in the range of 1.1 to 1.2.

14. The process as defined in claim 7, wherein the polymerized vinylic monomer has a polydispersity, $M_w/M_n$, in the range 1.5 to 3.

15. The process as defined in claim 1, wherein a hydrophobic polymer is formed in an amount of from 25 to 95% by weight, based on total core-shell emulsion polymer weight.

16. The process as defined in claim 1, wherein the water-soluble polymer containing amino groups is present in an amount of from 5 to 75% by weight, based on total core-shell emulsion polymer weight.

17. The process as defined in claim 7, wherein the free radical polymerization is accomplished via an amine/peroxide redox initiation.

18. The process as defined in claim 17, wherein the peroxide is an alkyl hydroperoxide.

19. The process as defined in claim 18, wherein a molar ratio of vinylic monomer to peroxide is more than 5000:1.

20. The process as defined in claim 1, where polymerization is achieved in the absence of a surfactant.

* * * * *